US006823425B2

(12) United States Patent
Ghosh et al.

(10) Patent No.: US 6,823,425 B2
(45) Date of Patent: Nov. 23, 2004

(54) SYSTEM AND METHOD FOR IMPLEMENTING ADVANCED RAID USING A SET OF UNIQUE MATRICES AS COEFFICIENTS

(75) Inventors: Sukha Ghosh, Lilburn, GA (US); Arvind Jain, Lilburn, CA (US); Thor Whalen, Atlanta, GA (US)

(73) Assignee: iVivity, Inc., Norcross, GA (US)

( * ) Notice: Subject to any disclaimer, the term of this patent is extended or adjusted under 35 U.S.C. 154(b) by 206 days.

(21) Appl. No.: 10/272,070

(22) Filed: Oct. 16, 2002

(65) Prior Publication Data

US 2004/0078643 A1 Apr. 22, 2004

Related U.S. Application Data

(60) Provisional application No. 60/345,040, filed on Oct. 23, 2001.

(51) Int. Cl.[7] .......................... G06F 12/00; G06F 11/00
(52) U.S. Cl. .......................... 711/114; 714/6; 714/770; 714/784
(58) Field of Search ........................ 711/114, 170, 711/112, 4; 714/6, 770, 784, 769, 799, 800, 805; 341/94

(56) References Cited

U.S. PATENT DOCUMENTS

| | | | | |
|---|---|---|---|---|
| 4,162,480 | A | * | 7/1979 | Berlekamp ................. 714/784 |
| 5,499,253 | A | | 3/1996 | Lary ........................ 371/40.1 |
| 6,101,615 | A | | 8/2000 | Lyons .......................... 714/6 |
| 6,148,430 | A | * | 11/2000 | Weng ......................... 714/770 |
| 6,161,192 | A | * | 12/2000 | Lubbers et al. ............. 711/114 |
| 6,189,124 | B1 | | 2/2001 | Glaise ........................ 714/758 |
| 6,370,671 | B1 | * | 4/2002 | Pan et al. ................... 714/784 |
| 6,412,090 | B1 | * | 6/2002 | Pan et al. ................... 714/784 |

OTHER PUBLICATIONS

Martin Schulze, et al, How Reliable is a Raid, 1989 IEEE p. 118–123.

H.C. Ferreira and S. Lin, Error and Erasure Control. (d,k) Block Codes, IEEE Transactions on Information Theory, vol. 37, No. 5, Sep. 1991, p. 1399–1408.

Alexander Barg and Shiyu Zhou, Linear–Time Binary Codes Correcting Localized Erasures, IEEE Transactions on Information Theory, vol. 45, No. 7, Nov. 1999, p. 2547–2557.

Patrick Stevens, Error–Erasure Decoding of Binary Cyclic Codes, US to a Particular Instance of the Hartmann–Tzeng Bound, IEEE Transactions on Information Theory, vol. 36, No. 5, Sep. 1990, p. 1144–1149.

Noga Alon and Michael Luby, A Linear Time Erasue–Resilient Code with Nearly Optimal Recovery, IEEE Transactions on Information Theory, vol. 42, No. 6, Nov. 1996, p. 1732–1736.

Noga Alon et al, Linear Time Erasure Codes with Nearly Optimal Recovery (Extended Abstract), 1995 IEEE.

(List continued on next page.)

*Primary Examiner*—Pierre Bataille
(74) *Attorney, Agent, or Firm*—Brian J. Anderson

(57) ABSTRACT

The present invention provides a generalized method for standard Galois Field operational schemes used in Advanced RAID parity calculations. This method places the standard-field and ring operations in their generalized context of linear operations, which can be described by matrices over the Galois Field with two elements (GF(2)). To ensure recovery of information, certain conditions on these matrices are imposed. A plurality of methods for generating such matrices are provided, thereby increasing the range of computational techniques for parity calculation. Further, the method provides increased flexibility and scope in finding a more efficient computational scheme that is adapted to a particular hardware or software implementation.

20 Claims, 13 Drawing Sheets

OTHER PUBLICATIONS

Norifumi Kamiya, On Acceptance Criterion for Efficient Successive Errors–and–Erasures Decoding of Reed–Solomon and BCH Codes, IEEE Transactions on Information Theory, vol. 43, No. 5, Sep. 1997, p. 1477–1487.

Shojiro Sakata et al, Fast Erasure–and–Error Decoding of Algebraic Geometry Codes Up to the Feng–Rao Bound, IEEE Transactions on Information Theory, vol. 44, No. 4, Jul. 1998, p. 1558–1564.

Osnat Keren and Simon Litsyn, A Class of Array Codes Correcting Multiple Column Erasures, IEEE Transactions on Information Theory, vol. 43, No. 6, Nov. 1997, p. 1843–1851.

Osnat Keren, Codes Correcting Phased Burst Erasures, IEEE Transactions on Information Theory, vol. 44, No. 1, Jan. 1998, p. 416–420.

Flaminio Borgonovo et al, Comparison of Different Error Control Schemes OFR Wirless ATM, 1999 IEEE, p. 416–420.

W van der Walt and HC Ferreira, Security of Levenshtein Synchronization Error Correcting Codes, 1994 IEEE, p. 466–470.

Bharat Bhargava et al, Implementing Object Support in the Raid Distributed Database System, 1990 IEEE, p. 81–84.

Yiqing Huang et al, Dependaility Analysis of a Cache–Based Raid System via Fast Distributed Simulation, 1998 IEEE, p. 268–277.

L. Newberg and D. Wolfe, String Layouts for a Redundant Array of Inexpensive Disks, p. 254–260.

Bharat Bhargava et al, Communication in the Raid Distributed Database System, 1990 IEEE, p. 400–407.

Jong–Hoon Kim et al, An Efficient Caching Scheme for Software Raid File Systems in Workstation Clusters, 1997 IEEE, p. 331–336.

H. Jayaram et al, The Impact of Smart Disks and Spatial Reuse Property on Raid–5 Storage Systems, 1998 IEEE, p. 21–28.

Michael G. Luby, Analysis of Random Processes Via and–or Tree Evaluation, p. 1–15.

Norifumi Kamiya, On Acceptance Criterion for Efficient Successive Errors–and–Erasures Decoding of Reed–Solomon and BCH Codes, IEEE Transactions on Information Theory, vol. 43, No. 5, Sep. 1997, p. 1477–1487.

H.C. Ferreira and S. Lin, Error and Erasure Conrol (d,K) Block Codes, IEEE Transactions on Information Theory, vol. 37, No. 5, Sep. 1991, p. 1399–1408.

Michael Luby, Practical Lose–Resilient Codes, p. 1–18.

* cited by examiner $$M = (X^7 + X^6 + X^3 + X^2 + 1)(X^6 + X^5 + X^3 + 1)$$

$$= (X^7 + X^6 + X^3 + X^2 + 1)X^6$$
$$+ (X^7 + X^6 + X^3 + X^2 + 1)X^5$$
$$+ (X^7 + X^6 + X^3 + X^2 + 1)X^3$$
$$+ (X^7 + X^6 + X^3 + X^2 + 1)1$$

$$= X^{13} + X^{12} + X^9 + X^8 + X^6$$
$$+ X^{12} + X^{11} + X^8 + X^7 + X^5$$
$$+ X^{10} + X^9 + X^6 + X^5 + X^3$$
$$+ X^7 + X^6 + X^3 + X^2 + 1$$

$$= X^{13} + X^{11} + X^{10} + X^6 + X^2 + 1.$$

Fig. 0A $$
\begin{aligned}
&\phantom{=}\ X^{13} \phantom{XXX} + X^{11} + X^{10} + \phantom{XXXXX} + X^{6} \phantom{XXXXXXX} + X^{2} \phantom{XX} + 1\\
&\phantom{=}\ + X^{13} \phantom{XXXXX} + X^{10} + X^{9} \phantom{XX} + X^{7} + X^{6}\\
&= \phantom{XXXXX} X^{11} \phantom{XXX} + X^{9} \phantom{XX} + X^{7} \phantom{XXXXXXXXX} + X^{2} \phantom{XX} + 1
\end{aligned}
$$

$$
\begin{aligned}
&\phantom{=}\ \phantom{XXX} X^{11} \phantom{XXX} + X^{9} \phantom{XX} + X^{7} \phantom{XXXXXXXXX} + X^{2} \phantom{XX} + 1\\
&\phantom{=}+ \phantom{XX} X^{11} \phantom{XXXXX} + X^{8} + X^{7} \phantom{XX} + X^{5} + X^{4}\\
&= \phantom{XXXXXXXX} X^{9} + X^{8} \phantom{XXXXX} + X^{5} + X^{4} \phantom{XX} + X^{2} \phantom{XX} + 1
\end{aligned}
$$

$$
\begin{aligned}
&\phantom{=}\ \phantom{XXX} X^{9} + X^{8} \phantom{XXXXX} + X^{5} + X^{4} \phantom{XX} + X^{2} \phantom{XX} + 1\\
&\phantom{=}+ \phantom{XXX} X^{9} \phantom{XXXXXXX} + X^{6} + X^{5} \phantom{XXX} + X^{3} + X^{2}\\
&= \phantom{XXXXXXX} X^{8} \phantom{XXX} + X^{6} \phantom{XXXXX} + X^{4} + X^{3} \phantom{XXXXXX} + 1
\end{aligned}
$$

$$
\begin{aligned}
&\phantom{=}\ \phantom{XXXXXX} X^{8} \phantom{XXX} + X^{6} \phantom{XXXXX} + X^{4} + X^{3} \phantom{XXXXXX} + 1\\
&\phantom{=}+ \phantom{XXXXXX} X^{8} \phantom{XXXXXXX} + X^{5} + X^{4} \phantom{XX} + X^{2} + X^{1}\\
&= \phantom{XXXXXXXXXXXXXX} X^{6} + X^{5} \phantom{XXXXX} + X^{3} + X^{2} + X^{1} + 1
\end{aligned}
$$

Fig. 0B

| Matrix 0 | Matrix 5 | Matrix 10 | Matrix 15 | Matrix 20 | Matrix 25 | Matrix 30 |
|---|---|---|---|---|---|---|
| 10000000 | 00110110 | 10010111 | 00110100 | 11010111 | 00101111 | 00100100 |
| 01000000 | 00011011 | 11110011 | 00011010 | 11010011 | 10101111 | 00010010 |
| 00100000 | 10110101 | 11000001 | 00001101 | 11010001 | 11101111 | 00001001 |
| 00010000 | 11100010 | 11011000 | 10111110 | 11010000 | 11001111 | 10111100 |
| 00001000 | 01110001 | 01101100 | 01011111 | 01101000 | 11011111 | 01011110 |
| 00000100 | 10000000 | 00110110 | 10010111 | 00110100 | 11010111 | 00101111 |
| 00000010 | 01000000 | 00011011 | 11110011 | 00011010 | 11010011 | 10101111 |
| 00000001 | 00100000 | 10110101 | 11000001 | 00001101 | 11010001 | 11101111 |
| | | | | | | |
| Matrix 1 | Matrix 6 | Matrix 11 | Matrix 16 | Matrix 21 | Matrix 26 | Matrix 31 |
| 01110001 | 01101100 | 01011111 | 01101000 | 11011111 | 01011110 | 01001000 |
| 10000000 | 00110110 | 10010111 | 00110100 | 11010111 | 00101111 | 00100100 |
| 01000000 | 00011011 | 11110011 | 00011010 | 11010011 | 10101111 | 00010010 |
| 00100000 | 10110101 | 11000001 | 00001101 | 11010001 | 11101111 | 00001001 |
| 00010000 | 11100010 | 11011000 | 10111110 | 11010000 | 11001111 | 10111100 |
| 00001000 | 01110001 | 01101100 | 01011111 | 01101000 | 11011111 | 01011110 |
| 00000100 | 10000000 | 00110110 | 10010111 | 00110100 | 11010111 | 00101111 |
| 00000010 | 01000000 | 00011011 | 11110011 | 00011010 | 11010011 | 10101111 |
| | | | | | | |
| Matrix 2 | Matrix 7 | Matrix 12 | Matrix 17 | Matrix 22 | Matrix 27 | Matrix 32 |
| 11100010 | 11011000 | 10111110 | 11010000 | 11001111 | 10111100 | 10010000 |
| 01110001 | 01101100 | 01011111 | 01101000 | 11011111 | 01011110 | 01001000 |
| 10000000 | 00110110 | 10010111 | 00110100 | 11010111 | 00101111 | 00100100 |
| 01000000 | 00011011 | 11110011 | 00011010 | 11010011 | 10101111 | 00010010 |
| 00100000 | 10110101 | 11000001 | 00001101 | 11010001 | 11101111 | 00001001 |
| 00010000 | 11100010 | 11011000 | 10111110 | 11010000 | 11001111 | 10111100 |
| 00001000 | 01110001 | 01101100 | 01011111 | 01101000 | 11011111 | 01011110 |
| 00000100 | 10000000 | 00110110 | 10010111 | 00110100 | 11010111 | 00101111 |
| | | | | | | |
| Matrix 3 | Matrix 8 | Matrix 13 | Matrix 18 | Matrix 23 | Matrix 28 | Matrix 33 |
| 10110101 | 11000001 | 00001101 | 11010001 | 11101111 | 00001001 | 01010001 |
| 11100010 | 11011000 | 10111110 | 11010000 | 11001111 | 10111100 | 10010000 |
| 01110001 | 01101100 | 01011111 | 01101000 | 11011111 | 01011110 | 01001000 |
| 10000000 | 00110110 | 10010111 | 00110100 | 11010111 | 00101111 | 00100100 |
| 01000000 | 00011011 | 11110011 | 00011010 | 11010011 | 10101111 | 00010010 |
| 00100000 | 10110101 | 11000001 | 00001101 | 11010001 | 11101111 | 00001001 |
| 00010000 | 11100010 | 11011000 | 10111110 | 11010000 | 11001111 | 10111100 |
| 00001000 | 01110001 | 01101100 | 01011111 | 01101000 | 11011111 | 01011110 |
| | | | | | | |
| Matrix 4 | Matrix 9 | Matrix 14 | Matrix 19 | Matrix 24 | Matrix 29 | Matrix 34 |
| 00011011 | 11110011 | 00011010 | 11010011 | 10101111 | 00010010 | 10100010 |
| 10110101 | 11000001 | 00001101 | 11010001 | 11101111 | 00001001 | 01010001 |
| 11100010 | 11011000 | 10111110 | 11010000 | 11001111 | 10111100 | 10010000 |
| 01110001 | 01101100 | 01011111 | 01101000 | 11011111 | 01011110 | 01001000 |
| 10000000 | 00110110 | 10010111 | 00110100 | 11010111 | 00101111 | 00100100 |
| 01000000 | 00011011 | 11110011 | 00011010 | 11010011 | 10101111 | 00010010 |
| 00100000 | 10110101 | 11000001 | 00001101 | 11010001 | 11101111 | 00001001 |
| 00010000 | 11100010 | 11011000 | 10111110 | 11010000 | 11001111 | 10111100 |

Fig. 4A

| Matrix 35 | Matrix 40 | Matrix 45 | Matrix 50 | Matrix 55 | Matrix 60 | Matrix 65 |
|---|---|---|---|---|---|---|
| 00110101 | 11110111 | 10011010 | 11100101 | 00111000 | 00100110 | 01110101 |
| 10100010 | 11000011 | 01001101 | 11001010 | 00011100 | 00010011 | 10000010 |
| 01010001 | 11011001 | 10011110 | 01100101 | 00001110 | 10110001 | 01000001 |
| 10010000 | 11010100 | 01001111 | 10001010 | 00000111 | 11100000 | 10011000 |
| 01001000 | 01101010 | 10011111 | 01000101 | 10111011 | 01110000 | 01001100 |
| 00100100 | 00110101 | 11110111 | 10011010 | 11100101 | 00111000 | 00100110 |
| 00010010 | 10100010 | 11000011 | 01001101 | 11001010 | 00011100 | 00010011 |
| 00001001 | 01010001 | 11011001 | 10011110 | 01100101 | 00001110 | 10110001 |
| | | | | | | |
| Matrix 36 | Matrix 41 | Matrix 46 | Matrix 51 | Matrix 56 | Matrix 61 | Matrix 66 |
| 01101010 | 10011111 | 01000101 | 10111011 | 01110000 | 01001100 | 11101010 |
| 00110101 | 11110111 | 10011010 | 11100101 | 00111000 | 00100110 | 01110101 |
| 10100010 | 11000011 | 01001101 | 11001010 | 00011100 | 00010011 | 10000010 |
| 01010001 | 11011001 | 10011110 | 01100101 | 00001110 | 10110001 | 01000001 |
| 10010000 | 11010100 | 01001111 | 10001010 | 00000111 | 11100000 | 10011000 |
| 01001000 | 01101010 | 10011111 | 01000101 | 10111011 | 01110000 | 01001100 |
| 00100100 | 00110101 | 11110111 | 10011010 | 11100101 | 00111000 | 00100110 |
| 00010010 | 10100010 | 11000011 | 01001101 | 11001010 | 00011100 | 00010011 |
| | | | | | | |
| Matrix 37 | Matrix 42 | Matrix 47 | Matrix 52 | Matrix 57 | Matrix 62 | Matrix 67 |
| 11010100 | 01001111 | 10001010 | 00000111 | 11100000 | 10011000 | 10100101 |
| 01101010 | 10011111 | 01000101 | 10111011 | 01110000 | 01001100 | 11101010 |
| 00110101 | 11110111 | 10011010 | 11100101 | 00111000 | 00100110 | 01110101 |
| 10100010 | 11000011 | 01001101 | 11001010 | 00011100 | 00010011 | 10000010 |
| 01010001 | 11011001 | 10011110 | 01100101 | 00001110 | 10110001 | 01000001 |
| 10010000 | 11010100 | 01001111 | 10001010 | 00000111 | 11100000 | 10011000 |
| 01001000 | 01101010 | 10011111 | 01000101 | 10111011 | 01110000 | 01001100 |
| 00100100 | 00110101 | 11110111 | 10011010 | 11100101 | 00111000 | 00100110 |
| | | | | | | |
| Matrix 38 | Matrix 43 | Matrix 48 | Matrix 53 | Matrix 58 | Matrix 63 | Matrix 68 |
| 11011001 | 10011110 | 01100101 | 00001110 | 10110001 | 01000001 | 00111011 |
| 11010100 | 01001111 | 10001010 | 00000111 | 11100000 | 10011000 | 10100101 |
| 01101010 | 10011111 | 01000101 | 10111011 | 01110000 | 01001100 | 11101010 |
| 00110101 | 11110111 | 10011010 | 11100101 | 00111000 | 00100110 | 01110101 |
| 10100010 | 11000011 | 01001101 | 11001010 | 00011100 | 00010011 | 10000010 |
| 01010001 | 11011001 | 10011110 | 01100101 | 00001110 | 10110001 | 01000001 |
| 10010000 | 11010100 | 01001111 | 10001010 | 00000111 | 11100000 | 10011000 |
| 01001000 | 01101010 | 10011111 | 01000101 | 10111011 | 01110000 | 01001100 |
| | | | | | | |
| Matrix 39 | Matrix 44 | Matrix 49 | Matrix 54 | Matrix 59 | Matrix 64 | Matrix 69 |
| 11000011 | 01001101 | 11001010 | 00011100 | 00010011 | 10000010 | 01110110 |
| 11011001 | 10011110 | 01100101 | 00001110 | 10110001 | 01000001 | 00111011 |
| 11010100 | 01001111 | 10001010 | 00000111 | 11100000 | 10011000 | 10100101 |
| 01101010 | 10011111 | 01000101 | 10111011 | 01110000 | 01001100 | 11101010 |
| 00110101 | 11110111 | 10011010 | 11100101 | 00111000 | 00100110 | 01110101 |
| 10100010 | 11000011 | 01001101 | 11001010 | 00011100 | 00010011 | 10000010 |
| 01010001 | 11011001 | 10011110 | 01100101 | 00001110 | 10110001 | 01000001 |
| 10010000 | 11010100 | 01001111 | 10001010 | 00000111 | 11100000 | 10011000 |

Fig. 4B

| Matrix 70 | Matrix 75 | Matrix 80 | Matrix 85 | Matrix 90 | Matrix 95 | Matrix 100 |
|---|---|---|---|---|---|---|
| 11101100 | 01101001 | 11111111 | 11101011 | 10001001 | 01100111 | 01001110 |
| 01110110 | 10001100 | 11000111 | 11001101 | 11111100 | 10001011 | 00100111 |
| 00111011 | 01000110 | 11011011 | 11011110 | 01111110 | 11111101 | 10101011 |
| 10100101 | 00100011 | 11010101 | 01101111 | 00111111 | 11000110 | 11101101 |
| 11101010 | 10101001 | 11010010 | 10001111 | 10100111 | 01100011 | 11001110 |
| 01110101 | 11101100 | 01101001 | 11111111 | 11101011 | 10001001 | 01100111 |
| 10000010 | 01110110 | 10001100 | 11000111 | 11001101 | 11111100 | 10001011 |
| 01000001 | 00111011 | 01000110 | 11011011 | 11011110 | 01111110 | 11111101 |
| | | | | | | |
| Matrix 71 | Matrix 76 | Matrix 81 | Matrix 86 | Matrix 91 | Matrix 96 | Matrix 101 |
| 10101001 | 11010010 | 10001111 | 10100111 | 01100011 | 11001110 | 10011100 |
| 11101100 | 01101001 | 11111111 | 11101011 | 10001001 | 01100111 | 01001110 |
| 01110110 | 10001100 | 11000111 | 11001101 | 11111100 | 10001011 | 00100111 |
| 00111011 | 01000110 | 11011011 | 11011110 | 01111110 | 11111101 | 10101011 |
| 10100101 | 00100011 | 11010101 | 01101111 | 00111111 | 11000110 | 11101101 |
| 11101010 | 10101001 | 11010010 | 10001111 | 10100111 | 01100011 | 11001110 |
| 01110101 | 11101100 | 01101001 | 11111111 | 11101011 | 10001001 | 01100111 |
| 10000010 | 01110110 | 10001100 | 11000111 | 11001101 | 11111100 | 10001011 |
| | | | | | | |
| Matrix 72 | Matrix 77 | Matrix 82 | Matrix 87 | Matrix 92 | Matrix 97 | Matrix 102 |
| 00100011 | 11010101 | 01101111 | 00111111 | 11000110 | 11101101 | 01001001 |
| 10101001 | 11010010 | 10001111 | 10100111 | 01100011 | 11001110 | 10011100 |
| 11101100 | 01101001 | 11111111 | 11101011 | 10001001 | 01100111 | 01001110 |
| 01110110 | 10001100 | 11000111 | 11001101 | 11111100 | 10001011 | 00100111 |
| 00111011 | 01000110 | 11011011 | 11011110 | 01111110 | 11111101 | 10101011 |
| 10100101 | 00100011 | 11010101 | 01101111 | 00111111 | 11000110 | 11101101 |
| 11101010 | 10101001 | 11010010 | 10001111 | 10100111 | 01100011 | 11001110 |
| 01110101 | 11101100 | 01101001 | 11111111 | 11101011 | 10001001 | 01100111 |
| | | | | | | |
| Matrix 73 | Matrix 78 | Matrix 83 | Matrix 88 | Matrix 93 | Matrix 98 | Matrix 103 |
| 01000110 | 11011011 | 11111110 | 01111110 | 11111101 | 10101011 | 10010010 |
| 00100011 | 11010101 | 01101111 | 00111111 | 11000110 | 11101101 | 01001001 |
| 10101001 | 11010010 | 10001111 | 10100111 | 01100011 | 11001110 | 10011100 |
| 11101100 | 01101001 | 11111111 | 11101011 | 10001001 | 01100111 | 01001110 |
| 01110110 | 10001100 | 11000111 | 11001101 | 11111100 | 10001011 | 00100111 |
| 00111011 | 01000110 | 11011011 | 11011110 | 01111110 | 11111101 | 10101011 |
| 10100101 | 00100011 | 11010101 | 01101111 | 00111111 | 11000110 | 11101101 |
| 11101010 | 10101001 | 11010010 | 10001111 | 10100111 | 01100011 | 11001110 |
| | | | | | | |
| Matrix 74 | Matrix 79 | Matrix 84 | Matrix 89 | Matrix 94 | Matrix 99 | Matrix 104 |
| 10001100 | 11000111 | 11001101 | 11111100 | 10001011 | 00100111 | 01010101 |
| 01000110 | 11011011 | 11011110 | 01111110 | 11111101 | 10101011 | 10010010 |
| 00100011 | 11010101 | 01101111 | 00111111 | 11000110 | 11101101 | 01001001 |
| 10101001 | 11010010 | 10001111 | 10100111 | 01100011 | 11001110 | 10011100 |
| 11101100 | 01101001 | 11111111 | 11101011 | 10001001 | 01100111 | 01001110 |
| 01110110 | 10001100 | 11000111 | 11001101 | 11111100 | 10001011 | 00100111 |
| 00111011 | 01000110 | 11011011 | 11011110 | 01111110 | 11111101 | 10101011 |
| 10100101 | 00100011 | 11010101 | 01101111 | 00111111 | 11000110 | 11101101 |

Fig. 4C

| Matrix 105 | Matrix 110 | Matrix 115 | Matrix 120 | Matrix 125 | Matrix 130 | Matrix 135 |
| --- | --- | --- | --- | --- | --- | --- |
| 10101010 | 10110010 | 00100001 | 10010101 | 01110100 | 11001100 | 11011100 |
| 01010101 | 01011001 | 10101000 | 11110010 | 00111010 | 01100110 | 01101110 |
| 10010010 | 10010100 | 01010100 | 01111001 | 00011101 | 00110011 | 00110111 |
| 01001001 | 01001010 | 00101010 | 10000100 | 10110110 | 10100001 | 10100011 |
| 10011100 | 00100101 | 00010101 | 01000010 | 01011011 | 11101000 | 11101001 |
| 01001110 | 10101010 | 10110010 | 00100001 | 10010101 | 01110100 | 11001100 |
| 00100111 | 01010101 | 01011001 | 10101000 | 11110010 | 00111010 | 01100110 |
| 10101011 | 10010010 | 10010100 | 01010100 | 01111001 | 00011101 | 00110011 |
| | | | | | | |
| Matrix 106 | Matrix 111 | Matrix 116 | Matrix 121 | Matrix 126 | Matrix 131 | Matrix 136 |
| 00100101 | 00010101 | 01000010 | 01011011 | 11101000 | 11101001 | 11001001 |
| 10101010 | 10110010 | 00100001 | 10010101 | 01110100 | 11001100 | 11011100 |
| 01010101 | 01011001 | 10101000 | 11110010 | 00111010 | 01100110 | 01101110 |
| 10010010 | 10010100 | 01010100 | 01111001 | 00011101 | 00110011 | 00110111 |
| 01001001 | 01001010 | 00101010 | 10000100 | 10110110 | 10100001 | 10100011 |
| 10011100 | 00100101 | 00010101 | 01000010 | 01011011 | 11101000 | 11101001 |
| 01001110 | 10101010 | 10110010 | 00100001 | 10010101 | 01110100 | 11001100 |
| 00100111 | 01010101 | 01011001 | 10101000 | 11110010 | 00111010 | 01100110 |
| | | | | | | |
| Matrix 107 | Matrix 112 | Matrix 117 | Matrix 122 | Matrix 127 | Matrix 132 | Matrix 137 |
| 01001010 | 00101010 | 10000100 | 10110110 | 10100001 | 10100011 | 11100011 |
| 00100101 | 00010101 | 01000010 | 01011011 | 11101000 | 11101001 | 11001001 |
| 10101010 | 10110010 | 00100001 | 10010101 | 01110100 | 11001100 | 11011100 |
| 01010101 | 01011001 | 10101000 | 11110010 | 00111010 | 01100110 | 01101110 |
| 10010010 | 10010100 | 01010100 | 01111001 | 00011101 | 00110011 | 00110111 |
| 01001001 | 01001010 | 00101010 | 10000100 | 10110110 | 10100001 | 10100011 |
| 10011100 | 00100101 | 00010101 | 01000010 | 01011011 | 11101000 | 11101001 |
| 01001110 | 10101010 | 10110010 | 00100001 | 10010101 | 01110100 | 11001100 |
| | | | | | | |
| Matrix 108 | Matrix 113 | Matrix 118 | Matrix 123 | Matrix 128 | Matrix 133 | Matrix 138 |
| 10010100 | 01010100 | 01111001 | 00011101 | 00110011 | 00110111 | 10110111 |
| 01001010 | 00101010 | 10000100 | 10110110 | 10100001 | 10100011 | 11100011 |
| 00100101 | 00010101 | 01000010 | 01011011 | 11101000 | 11101001 | 11001001 |
| 10101010 | 10110010 | 00100001 | 10010101 | 01110100 | 11001100 | 11011100 |
| 01010101 | 01011001 | 10101000 | 11110010 | 00111010 | 01100110 | 01101110 |
| 10010010 | 10010100 | 01010100 | 01111001 | 00011101 | 00110011 | 00110111 |
| 01001001 | 01001010 | 00101010 | 10000100 | 10110110 | 10100001 | 10100011 |
| 10011100 | 00100101 | 00010101 | 01000010 | 01011011 | 11101000 | 11101001 |
| | | | | | | |
| Matrix 109 | Matrix 114 | Matrix 119 | Matrix 124 | Matrix 129 | Matrix 134 | Matrix 139 |
| 01011001 | 10101000 | 11110010 | 00111010 | 01100110 | 01101110 | 00011111 |
| 10010100 | 01010100 | 01111001 | 00011101 | 00110011 | 00110111 | 10110111 |
| 01001010 | 00101010 | 10000100 | 10110110 | 10100001 | 10100011 | 11100011 |
| 00100101 | 00010101 | 01000010 | 01011011 | 11101000 | 11101001 | 11001001 |
| 10101010 | 10110010 | 00100001 | 10010101 | 01110100 | 11001100 | 11011100 |
| 01010101 | 01011001 | 10101000 | 11110010 | 00111010 | 01100110 | 01101110 |
| 10010010 | 10010100 | 01010100 | 01111001 | 00011101 | 00110011 | 00110111 |
| 01001001 | 01001010 | 00101010 | 10000100 | 10110110 | 10100001 | 10100011 |

Fig. 4D

| Matrix 140 | Matrix 145 | Matrix 150 | Matrix 155 | Matrix 160 | Matrix 165 | Matrix 170 |
|---|---|---|---|---|---|---|
| 00111110 | 11100110 | 01011000 | 10001000 | 01000111 | 11111011 | 01101011 |
| 00011111 | 01110011 | 00101100 | 01000100 | 10011011 | 11000101 | 10001101 |
| 10110111 | 10000001 | 00010110 | 00100010 | 11110101 | 11011010 | 11111110 |
| 11100011 | 11111000 | 00001011 | 00010001 | 11000010 | 01101101 | 01111111 |
| 11001001 | 01111100 | 10111101 | 10110000 | 01100001 | 10001110 | 10000111 |
| 11011100 | 00111110 | 11100110 | 01011000 | 10001000 | 01000111 | 11111011 |
| 01101110 | 00011111 | 01110011 | 00101100 | 01000100 | 10011011 | 11000101 |
| 00110111 | 10110111 | 10000001 | 00010110 | 00100010 | 11110101 | 11011010 |

| Matrix 141 | Matrix 146 | Matrix 151 | Matrix 156 | Matrix 161 | Matrix 166 | Matrix 171 |
|---|---|---|---|---|---|---|
| 01111100 | 10111101 | 10110000 | 01100001 | 10001110 | 10000111 | 11010110 |
| 00111110 | 11100110 | 01011000 | 10001000 | 01000111 | 11111011 | 01101011 |
| 00011111 | 01110011 | 00101100 | 01000100 | 10011011 | 11000101 | 10001101 |
| 10110111 | 10000001 | 00010110 | 00100010 | 11110101 | 11011010 | 11111110 |
| 11100011 | 11111000 | 00001011 | 00010001 | 11000010 | 01101101 | 01111111 |
| 11001001 | 01111100 | 10111101 | 10110000 | 01100001 | 10001110 | 10000111 |
| 11011100 | 00111110 | 11100110 | 01011000 | 10001000 | 01000111 | 11111011 |
| 01101110 | 00011111 | 01110011 | 00101100 | 01000100 | 10011011 | 11000101 |

| Matrix 142 | Matrix 147 | Matrix 152 | Matrix 157 | Matrix 162 | Matrix 167 | Matrix 172 |
|---|---|---|---|---|---|---|
| 11111000 | 00001011 | 00010001 | 11000010 | 01101101 | 01111111 | 11011101 |
| 01111100 | 10111101 | 10110000 | 01100001 | 10001110 | 10000111 | 11010110 |
| 00111110 | 11100110 | 01011000 | 10001000 | 01000111 | 11111011 | 01101011 |
| 00011111 | 01110011 | 00101100 | 01000100 | 10011011 | 11000101 | 10001101 |
| 10110111 | 10000001 | 00010110 | 00100010 | 11110101 | 11011010 | 11111110 |
| 11100011 | 11111000 | 00001011 | 00010001 | 11000010 | 01101101 | 01111111 |
| 11001001 | 01111100 | 10111101 | 10110000 | 01100001 | 10001110 | 10000111 |
| 11011100 | 00111110 | 11100110 | 01011000 | 10001000 | 01000111 | 11111011 |

| Matrix 143 | Matrix 148 | Matrix 153 | Matrix 158 | Matrix 163 | Matrix 168 | Matrix 173 |
|---|---|---|---|---|---|---|
| 10000001 | 00010110 | 00100010 | 11110101 | 11011010 | 11111110 | 11001011 |
| 11111000 | 00001011 | 00010001 | 11000010 | 01101101 | 01111111 | 11011101 |
| 01111100 | 10111101 | 10110000 | 01100001 | 10001110 | 10000111 | 11010110 |
| 00111110 | 11100110 | 01011000 | 10001000 | 01000111 | 11111011 | 01101011 |
| 00011111 | 01110011 | 00101100 | 01000100 | 10011011 | 11000101 | 10001101 |
| 10110111 | 10000001 | 00010110 | 00100010 | 11110101 | 11011010 | 11111110 |
| 11100011 | 11111000 | 00001011 | 00010001 | 11000010 | 01101101 | 01111111 |
| 11001001 | 01111100 | 10111101 | 10110000 | 01100001 | 10001110 | 10000111 |

| Matrix 144 | Matrix 149 | Matrix 154 | Matrix 159 | Matrix 164 | Matrix 169 | Matrix 174 |
|---|---|---|---|---|---|---|
| 01110011 | 00101100 | 01000100 | 10011011 | 11000101 | 10001101 | 11100111 |
| 10000001 | 00010110 | 00100010 | 11110101 | 11011010 | 11111110 | 11001011 |
| 11111000 | 00001011 | 00010001 | 11000010 | 01101101 | 01111111 | 11011101 |
| 01111100 | 10111101 | 10110000 | 01100001 | 10001110 | 10000111 | 11010110 |
| 00111110 | 11100110 | 01011000 | 10001000 | 01000111 | 11111011 | 01101011 |
| 00011111 | 01110011 | 00101100 | 01000100 | 10011011 | 11000101 | 10001101 |
| 10110111 | 10000001 | 00010110 | 00100010 | 11110101 | 11011010 | 11111110 |
| 11100011 | 11111000 | 00001011 | 00010001 | 11000010 | 01101101 | 01111111 |

Fig. 4E

| Matrix 175 | Matrix 180 | Matrix 185 | Matrix 190 | Matrix 195 | Matrix 200 | Matrix 205 |
|---|---|---|---|---|---|---|
| 10111111 | 11110000 | 01111010 | 01111101 | 10011101 | 00000101 | 10100000 |
| 11100111 | 01111000 | 00111101 | 10000110 | 11110110 | 10111010 | 01010000 |
| 11001011 | 00111100 | 10100110 | 01000011 | 01111011 | 01011101 | 00101000 |
| 11011101 | 00011110 | 01010011 | 10011001 | 10000101 | 10010110 | 00010100 |
| 11010110 | 00001111 | 10010001 | 11110100 | 11111010 | 01001011 | 00001010 |
| 01101011 | 10111111 | 11110000 | 01111010 | 01111101 | 10011101 | 00000101 |
| 10001101 | 11100111 | 01111000 | 00111101 | 10000110 | 11110110 | 10111010 |
| 11111110 | 11001011 | 00111100 | 10100110 | 01000011 | 01111011 | 01011101 |
| | | | | | | |
| Matrix 176 | Matrix 181 | Matrix 186 | Matrix 191 | Matrix 196 | Matrix 201 | Matrix 206 |
| 00001111 | 10010001 | 11110100 | 11111010 | 01001011 | 00001010 | 00110001 |
| 10111111 | 11110000 | 01111010 | 01111101 | 10011101 | 00000101 | 10100000 |
| 11100111 | 01111000 | 00111101 | 10000110 | 11110110 | 10111010 | 01010000 |
| 11001011 | 00111100 | 10100110 | 01000011 | 01111011 | 01011101 | 00101000 |
| 11011101 | 00011110 | 01010011 | 10011001 | 10000101 | 10010110 | 00010100 |
| 11010110 | 00001111 | 10010001 | 11110100 | 11111010 | 01001011 | 00001010 |
| 01101011 | 10111111 | 11110000 | 01111010 | 01111101 | 10011101 | 00000101 |
| 10001101 | 11100111 | 01111000 | 00111101 | 10000110 | 11110110 | 10111010 |
| | | | | | | |
| Matrix 177 | Matrix 182 | Matrix 187 | Matrix 192 | Matrix 197 | Matrix 202 | Matrix 207 |
| 00011110 | 01010011 | 10011001 | 10000101 | 10010110 | 00010100 | 01100010 |
| 00001111 | 10010001 | 11110100 | 11111010 | 01001011 | 00001010 | 00110001 |
| 10111111 | 11110000 | 01111010 | 01111101 | 10011101 | 00000101 | 10100000 |
| 11100111 | 01111000 | 00111101 | 10000110 | 11110110 | 10111010 | 01010000 |
| 11001011 | 00111100 | 10100110 | 01000011 | 01111011 | 01011101 | 00101000 |
| 11011101 | 00011110 | 01010011 | 10011001 | 10000101 | 10010110 | 00010100 |
| 11010110 | 00001111 | 10010001 | 11110100 | 11111010 | 01001011 | 00001010 |
| 01101011 | 10111111 | 11110000 | 01111010 | 01111101 | 10011101 | 00000101 |
| | | | | | | |
| Matrix 178 | Matrix 183 | Matrix 188 | Matrix 193 | Matrix 198 | Matrix 203 | Matrix 208 |
| 00111100 | 10100110 | 01000011 | 01111011 | 01011101 | 00101000 | 11000100 |
| 00011110 | 01010011 | 10011001 | 10000101 | 10010110 | 00010100 | 01100010 |
| 00001111 | 10010001 | 11110100 | 11111010 | 01001011 | 00001010 | 00110001 |
| 10111111 | 11110000 | 01111010 | 01111101 | 10011101 | 00000101 | 10100000 |
| 11100111 | 01111000 | 00111101 | 10000110 | 11110110 | 10111010 | 01010000 |
| 11001011 | 00111100 | 10100110 | 01000011 | 01111011 | 01011101 | 00101000 |
| 11011101 | 00011110 | 01010011 | 10011001 | 10000101 | 10010110 | 00010100 |
| 11010110 | 00001111 | 10010001 | 11110100 | 11111010 | 01001011 | 00001010 |
| | | | | | | |
| Matrix 179 | Matrix 184 | Matrix 189 | Matrix 194 | Matrix 199 | Matrix 204 | Matrix 209 |
| 01111000 | 00111101 | 10000110 | 11110110 | 10111010 | 01010000 | 11111001 |
| 00111100 | 10100110 | 01000011 | 01111011 | 01011101 | 00101000 | 11000100 |
| 00011110 | 01010011 | 10011001 | 10000101 | 10010110 | 00010100 | 01100010 |
| 00001111 | 10010001 | 11110100 | 11111010 | 01001011 | 00001010 | 00110001 |
| 10111111 | 11110000 | 01111010 | 01111101 | 10011101 | 00000101 | 10100000 |
| 11100111 | 01111000 | 00111101 | 10000110 | 11110110 | 10111010 | 01010000 |
| 11001011 | 00111100 | 10100110 | 01000011 | 01111011 | 01011101 | 00101000 |
| 11011101 | 00011110 | 01010011 | 10011001 | 10000101 | 10010110 | 00010100 |

Fig. 4F

| Matrix 210 | Matrix 215 | Matrix 220 | Matrix 225 | Matrix 230 | Matrix 235 | Matrix 240 |
|---|---|---|---|---|---|---|
| 10000011 | 01010110 | 00111001 | 00000110 | 11000000 | 00101101 | 01100100 |
| 11111001 | 00101011 | 10100100 | 00000011 | 01100000 | 10101110 | 00110010 |
| 11000100 | 10101101 | 01010010 | 10111001 | 00110000 | 01010111 | 00011001 |
| 01100010 | 11101110 | 00101001 | 11100100 | 00011000 | 10010011 | 10110100 |
| 00110001 | 01110111 | 10101100 | 01110010 | 00001100 | 11110001 | 01011010 |
| 10100000 | 10000011 | 01010110 | 00111001 | 00000110 | 11000000 | 00101101 |
| 01010000 | 11111001 | 00101011 | 10100100 | 00000011 | 01100000 | 10101110 |
| 00101000 | 11000100 | 10101101 | 01010010 | 10111001 | 00110000 | 01010111 |
| | | | | | | |
| Matrix 211 | Matrix 216 | Matrix 221 | Matrix 226 | Matrix 231 | Matrix 236 | Matrix 241 |
| 01110111 | 10101100 | 01110010 | 00001100 | 11110001 | 01011010 | 11001000 |
| 10000011 | 01010110 | 00111001 | 00000110 | 11000000 | 00101101 | 01100100 |
| 11111001 | 00101011 | 10100100 | 00000011 | 01100000 | 10101110 | 00110010 |
| 11000100 | 10101101 | 01010010 | 10111001 | 00110000 | 01010111 | 00011001 |
| 01100010 | 11101110 | 00101001 | 11100100 | 00011000 | 10010011 | 10110100 |
| 00110001 | 01110111 | 10101100 | 01110010 | 00001100 | 11110001 | 01011010 |
| 10100000 | 10000011 | 01010110 | 00111001 | 00000110 | 11000000 | 00101101 |
| 01010000 | 11111001 | 00101011 | 10100100 | 00000011 | 01100000 | 10101110 |
| | | | | | | |
| Matrix 212 | Matrix 217 | Matrix 222 | Matrix 227 | Matrix 232 | Matrix 237 | Matrix 242 |
| 11101110 | 00101001 | 11100100 | 00011000 | 10010011 | 10110100 | 11100001 |
| 01110111 | 10101100 | 01110010 | 00001100 | 11110001 | 01011010 | 11001000 |
| 10000011 | 01010110 | 00111001 | 00000110 | 11000000 | 00101101 | 01100100 |
| 11111001 | 00101011 | 10100100 | 00000011 | 01100000 | 10101110 | 00110010 |
| 11000100 | 10101101 | 01010010 | 10111001 | 00110000 | 01010111 | 00011001 |
| 01100010 | 11101110 | 00101001 | 11100100 | 00011000 | 10010011 | 10110100 |
| 00110001 | 01110111 | 10101100 | 01110010 | 00001100 | 11110001 | 01011010 |
| 10100000 | 10000011 | 01010110 | 00111001 | 00000110 | 11000000 | 00101101 |
| | | | | | | |
| Matrix 213 | Matrix 218 | Matrix 223 | Matrix 228 | Matrix 233 | Matrix 238 | Matrix 243 |
| 10101101 | 01010010 | 10111001 | 00110000 | 01010111 | 00011001 | 10110011 |
| 11101110 | 00101001 | 11100100 | 00011000 | 10010011 | 10110100 | 11100001 |
| 01110111 | 10101100 | 01110010 | 00001100 | 11110001 | 01011010 | 11001000 |
| 10000011 | 01010110 | 00111001 | 00000110 | 11000000 | 00101101 | 01100100 |
| 11111001 | 00101011 | 10100100 | 00000011 | 01100000 | 10101110 | 00110010 |
| 11000100 | 10101101 | 01010010 | 10111001 | 00110000 | 01010111 | 00011001 |
| 01100010 | 11101110 | 00101001 | 11100100 | 00011000 | 10010011 | 10110100 |
| 00110001 | 01110111 | 10101100 | 01110010 | 00001100 | 11110001 | 01011010 |
| | | | | | | |
| Matrix 214 | Matrix 219 | Matrix 224 | Matrix 229 | Matrix 234 | Matrix 239 | Matrix 244 |
| 00101011 | 10100100 | 00000011 | 01100000 | 10101110 | 00110010 | 00010111 |
| 10101101 | 01010010 | 10111001 | 00110000 | 01010111 | 00011001 | 10110011 |
| 11101110 | 00101001 | 11100100 | 00011000 | 10010011 | 10110100 | 11100001 |
| 01110111 | 10101100 | 01110010 | 00001100 | 11110001 | 01011010 | 11001000 |
| 10000011 | 01010110 | 00111001 | 00000110 | 11000000 | 00101101 | 01100100 |
| 11111001 | 00101011 | 10100100 | 00000011 | 01100000 | 10101110 | 00110010 |
| 11000100 | 10101101 | 01010010 | 10111001 | 00110000 | 01010111 | 00011001 |
| 01100010 | 11101110 | 00101001 | 11100100 | 00011000 | 10010011 | 10110100 |

Fig. 4G

| Matrix 245 | Matrix 247 | Matrix 249 | Matrix 251 | Matrix 252 | Matrix 253 | Matrix 254 |
|---|---|---|---|---|---|---|
| 00101110 | 10111000 | 00000010 | 00001000 | 00010000 | 00100000 | 01000000 |
| 00010111 | 01011100 | 00000001 | 00000100 | 00001000 | 00010000 | 00100000 |
| 10110011 | 00101110 | 10111000 | 00000010 | 00000100 | 00001000 | 00010000 |
| 11100001 | 00010111 | 01011100 | 00000001 | 00000010 | 00000100 | 00001000 |
| 11001000 | 10110011 | 00101110 | 10111000 | 00000001 | 00000010 | 00000100 |
| 01100100 | 11100001 | 00010111 | 01011100 | 10111000 | 00000001 | 00000010 |
| 00110010 | 11001000 | 10110011 | 00101110 | 01011100 | 10111000 | 00000001 |
| 00011001 | 01100100 | 11100001 | 00010111 | 00101110 | 01011100 | 10111000 |
| | | | | | | |
| Matrix 246 | Matrix 248 | Matrix 250 | | | | |
| 01011100 | 00000001 | 00000100 | | | | |
| 00101110 | 10111000 | 00000010 | | | | |
| 00010111 | 01011100 | 00000001 | | | | |
| 10110011 | 00101110 | 10111000 | | | | |
| 11100001 | 00010111 | 01011100 | | | | |
| 11001000 | 10110011 | 00101110 | | | | |
| 01100100 | 11100001 | 00010111 | | | | |
| 00110010 | 11001000 | 10110011 | | | | |

Fig. 4H

SYSTEM AND METHOD FOR IMPLEMENTING ADVANCED RAID USING A SET OF UNIQUE MATRICES AS COEFFICIENTS

This application claims an invention which was disclosed in Provisional Application No. 60/345,040, filed Oct. 23, 2001, entitled "SYSTEM AND METHOD FOR IMPLEMENTING ADVANCED RAID USING A SET OF UNIQUE MATRICES AS COEFFICIENTS". The benefit under 35 U.S.C § 119(e) of the United States provisional application is fully claimed, and the aforementioned application is hereby incorporated herein by reference.

BACKGROUND OF THE INVENTION

1. Field of the Invention

The present invention generally relates to storage systems. More specifically, the present invention pertains to systems and methods for implementing advanced RAID using a set of unique matrices as coefficients.

2. Description of the Related Art

The speed of most processors is increasing faster than the speed of virtually all input/output (I/O) devices. As a response to this widening gap, the invention of the so called RAID (Redundant Array of Independent Disks) system was invented, which is aimed to increase the speed of disk drive reads and writes by replacing single disk drive unit with an array of a plurality of disks with smaller storage capacity. The data contained therein is accessed in parallel.

However, a drawback which is inherent with this solution is while the amount of parallelism (hence efficiency) increases with the size of the array (i.e., the number of disks it contains), the probability of disk failure increases as well. Disk failure may result in the loss of data. Therefore, a method that is able to recover the information contained in any one of the disks needs to be provided.

One known method of insuring the recovery of the data loss in anyone of the disks in an array is to always have two disks containing exactly the same data. This technique (i.e. the so-called mirroring) is used in RAID level 1 architectures. The drawback of this solution is that half of the space needs to be allocated for redundancy.

Another known method is to have a single disk reserved for parity. Here the RAID system will maintain the parity disk to contain the bitwise XOR of all the other disks at all times. If any disk of the array fails, the information contained therein can be recovered along with the information of all the other disks (including the parity disk). The parity information is usually "striped" over all the disks of the array to avoid a bottleneck on one singled out parity disk (RAID level 5). It should be noted that maintaining the system in its "safe" state requires the parity disk to be updated as soon as any data is updated in other disks.

The Advanced RAID systems deal with the capability to recover data when two or more disks fail in a predetermined period before recovering occurs. One known approach to this problem is to group data disks into different "parity groups" each of which has it's corresponding parity disk. In this approach, the system maintains the bitwise XOR of the data of every disk of the same parity group on its corresponding parity disk. Much research has been done in this area. For example, a good tutorial on Reed-Solomon methods in RAID-like systems can be seen in "A tutorial on Reed-Solomon Coding for Fault-Tolerance in RAID-like Systems." By James S. Plank (Technical Report UT-CS-96-332, Jul. 19, 1996). It can be proven that this method requires $\log_2(N)$ parity disks to take care of N data disks.

It is desirous to have a system that is able to recover from disk failures originating from any two disks and maintaining a minimum number of possible redundancy disks; for example with only two redundancy disks. One standard Advanced RAID scheme using the bare minimum amount of redundancy information uses Reed-Solomon codes. The following is a brief description of the same.

First, a word size is fixed. The disks may be conceptualized as a sequence of chunks of memory, and each chunk (or word) having a fixed size. The redundancy words will then by computed over the data words of a same line. A line is defined as a sequence of words; and each word of the sequence comes from a distinct disk. Basically, as far as the coding scheme is concerned, one can think of our disks as containing only one word of fixed size. The details of implementation—such as the actual size of read and writes, stripping method, etc.—are irrelevant as far as the coding scheme is concerned.

Let $D_1, D_2, \ldots, D_N$ be the n data words of the N respective disks of the array. Further let P and Q be the two corresponding redundancy words. In a Reed-Solomon based scheme, P and Q are maintained to be $P = D_1 + D_2 + \ldots + D_N$ and $Q = c_1 * D_1 + c_2 * D_2 + \ldots + c_N * D_N,$ where all operations take place in a carefully chosen Galois field, and $c_1, c_2, \ldots, c_N$ are carefully chosen distinct words of this Field.

In the context of Galois Fields, it helps to think of the following three elements (i.e., the bits of our data, redundant backup, and coefficient words) as being coefficients of a polynomial over GF(2). For example, if our words are of size 8, the words 11001101, 01101001 and 00111100 correspond respectively to polynomials:

$X^7 + X^6 + X^3 + X^2 + 1,$ $X^6 + X^5 + X^3 + 1,$ and $X^5 + X^4 + X^3 + X^2.$ The degree of a polynomial is the largest exponent appearing as a superscript of the X's. The degrees of the three above polynomials are respectfully 7, 6, and 5.

The sum of two words then corresponds to summing the two corresponding polynomials (in GF(2), where, since 2=0, we have $X^i + X^i = 0$); this corresponds to the bitwise XORing of both words. For example, the sum of the words 11001101 and 01101001 is 10100100. From now on the reader must understand the sum of two words as being what has just been described.

The * operand corresponds to polynomial multiplication, and a final reduction modulo by the fixed irreducible polynomial which generates the Field. An irreducible polynomial is a polynomial which can not be obtained by multiplying two other polynomials together (just as a prime number is one which is not the product of two other numbers). For example, let $F = X^8 + X^5 + X^4 + X^2 + X^1$ be our chosen irreducible polynomial (field generator). To obtain the word 11001101*01101001 we first find the product M of the corresponding polynomials; and M is as shown in FIG. 0A.

One then computes the remainder of M through the Euclidian division by F. This corresponds to adding shifts of F (polynomials of the form $X^a$ F for some natural number a) to M until we get rid of all the terms of degree higher or equal to the degree of F. The computation is shown by FIG. 0B. Thus 11001101*01101001=01101111 in the field generated by F.

The point of working in a field is that every element of a field is invertible. That is to say, for any word there is a corresponding "inverse word" $w^{-1}$ such that $w*w^{-1}=00\ldots 01$. This relationship may be used to precisely recover lost information resulting from such events as failed disks.

A further example is provided to depict how one can recover data when the relations $$P=D_1+D_2+\ldots +D_N \text{ and}$$

$$Q=c_1*D_1+c_2*D_2+\ldots +c_N*D_N,$$

are maintained. Assuming disk 1 and disk 2 fail. This means that the information contained in $D_1$ and $D_2$ are lost. By solving the above system of equations for $D_1$ and $D_2$, we get $$D_1=(c_1+c_2)^{-1}*(c_2*P+Q+c_3*D_3+\ldots +c_N*D_N)$$

and $$D_2=P+D_1+D_3+\ldots +D_N.$$

As can be seen, $D_1$ and $D_2$ can be computed if P, Q, $D_3$, $D_4, \ldots, D_N$ are not lost (or are known).

It can further be seen that in order to maintain the system in a safe state the * operation must be done not only at every update of a data word, but also needs to be done many times during recovery. Therefore, the field generating polynomial and the N coefficients must be chosen carefully so as to minimize the time needed to compute the * operation between two words.

Lookup table methods have been used to compute the * operation, but this method becomes unreasonable as the word size increases. For example, too many calculations are needed in a too limited period of time. Yet a smaller word size induces a larger number of operations per data block, hence the need to increase the word size or pipe line the operations is required U.S. Pat. No. 5,499,253, entitled "System and Method for Calculating RAID 6 Check Codes" teaches a careful matching of the characteristics of the Commutative Ring in which calculations take place to the capabilities of modern high-speed computers.

U.S. Pat. No. 6,148,430, entitled "Encoding Apparatus for RAID-6 System and Tape Drives" teaches a system including an irreducible polynomial. The choice of the polynomial or a "good generating polynomial" show that one can find such good polynomials for arbitrary large word sizes.

As pointed out in U.S. Pat. No. 5,499,253, one does not need all the properties of Galois Fields for the specific purpose of maintaining the system in a recoverable state. A less restrictive * operation (placing it in what is called a Commutative Ring) is desirable to increase the space of possible generating polynomials, thereby finding one which reduces further the complexity of the * operation. Therefore, for two large words, one can also compute the * operation with controlled complexity by carefully choosing the polynomial generating the Galois Field. Large word means any suitable sized word in use without reducing the size of the word for fitting into a specific system. For example, if it is desirous to use 32 bit words in a system, and it is required to done size the 32 bit words to 8 bit for processing, then 32 bit word is the big word and 8 bit word is not.

As can be appreciated, it is desirous to generalize the known field and ring methods to any suitable large word sizes. One resultant benefit is the increased range of computational techniques for parity calculations, thereby allowing more flexibility and scope in finding an adaptable and efficient computational scheme. For example, word size can be any size; it may be as small as 4 bits and as large as any suitable size. With the increase in the word size, the scope (i.e., number) of co-efficients can be correspondingly increased as well. Therefore, it is desirable to a system and method for permitting more flexibility and scope in finding the adaptable and efficient computational scheme such that a generalized approaching using field and ring can be applied.

SUMMARY OF THE INVENTION

The present invention provides a generalized method for standard Galois Field operational schemes used in Advanced RAID parity calculations. This method places the standard field and ring operations in their generalized context of linear operations, which can be described by matrices over the Galois Field with two elements (GF(2)). To ensure recovery of information, one must impose certain conditions on these matrices. A plurality of methods for generating such matrices are provided, thereby increasing the range of computational techniques for parity calculation. Further, the method provides increased flexibility and scope in finding a more efficient computational scheme that is adapted to a particular hardware or software implementation.

Accordingly, in an advanced RAID system, having at least one array of n disks wherein n is a positive integer greater than or equal to 2 is provided. The RAID system further has a set of m redundancy disks associated with said at least one array wherein m is a positive integer greater than or equal to 3. The system further includes data and redundancy data in the form of a set of word segments residing in the above disks. The word segments have equal length and predetermined size. A method for updating redundancy information and associated with the advanced RAID system, includes: providing a first expression of redundancy data in terms of a first summation of a sequence of data, said sequence including a summation of data segments; providing a second expression of redundancy data in terms of a second summation, wherein the elements of said second summation includes elements of the first summation having each of the elements contained therein multiplied by a first sequence of co-effiecients; providing a $m^{th}$ expression of redundancy data in terms of a $(m-1)^{th}$ summation of a sequence of data, wherein the elements of said $(m-1)^{th}$ summation includes elements of the $m^{th}$ summation having each of the elements multiplied by a $(m-1)^{th}$ sequence of co-effiecients; computing said first expression having at most m unknown values; computing said second expression having at most m unknown values, and second expression includes a set of translation of said sequence of data, said translation of data being subjected to conditions including for any 2 given words w and w' $T_k(w+w')=T_k(w)+T_k(w')$; and computing a $(m-1)^{th}$ set of values representing said $m^{th}$ sequence of co-efficients. Thereby a large set of co-efficients for first to m-1 expressions can be carefully selected for use in redundancy calculations for at most m disk failures.

In addition, an advanced RAID system, having at least one array of n disks wherein n is a positive integer greater than or equal to 2, and a set of 2 redundancy disks associated with said at least one array is accordingly provided. The system further includes data and redundancy data in the form of a set of word segments residing in the above disks.

The word segments have equal length and predetermined size. A method for updating redundancy information associated with the advanced RAID system, including: providing a first expression of redundancy data in terms of a first summation of a sequence of data, said sequence including a summation of data segments; providing a second expression of redundancy data in terms of a second summation, wherein the elements of said second summation includes elements of the first summation having each of the elements contained therein multiplied by a first sequence of co-effiecients; computing said first expression having at most 2 unknown values; computing said second expression having at most 2 unknown values, and second expression includes a set of translation of said sequence of data, said translation of data being subjected to conditions including for any 2 given words w and w' $T_k(w+w')=T_k(w)+T_k(w')$; and computing a $(m-1)^{th}$ set of values representing said $m^{th}$ sequence of co-efficients. Thereby a large set of co-efficients for 2 expressions can be carefully selected for use in redundancy calculations for at most 2 disk failures.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 0A shows a first computation example.

FIG. 0B shows a second computation example.

FIGS. 4A–4H, in combination, are a table showing an exemplified computing result of the instant invention.

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
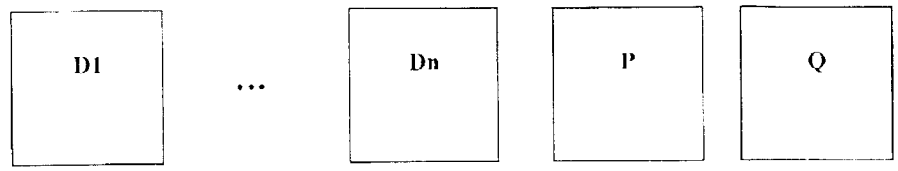
FIG. 1 is an array of data disks with 2 parity check disks.

Referring to FIG. 1, an array of disks is shown. A set of data disks D1 . . . Dn, where n may be any integer greater than or equal to 2, is shown. A backup disk P and a backup disk Q is also provided. It should be noted that for practical purposes, only 2 backup disks are shown and discussed in detail herein. However, more disks may be used for backup purposes if required. Further, this array may be part of a larger disk array system. In the present invention, the * operation described supra takes a word of size N (where N denotes bit number) and returns another word of size N. It is then through this "translation" of the original word that was summed with the other words in the same line, thereby translating itself via its own distinct translator. In this sense, the P word (a specific word in disk P) corresponds to the sum of every word of the same line, and the Q word (a specific word in disk Q) is the sum of the translations of every word of the same line. It is noted that the translation operation could be costly since it was done through field multiplication.

Turning now to the translation process, the present invention provides a translation scheme of a word of size N to another word of size N in a more general context, yet keeping all other aspects of standard ADVANCED RAID described supra unchanged. For example, word size can be any size; it may be as small as 4 bits and as large as any suitable size. With the increase in the word size, the scope (i.e., number) of co-efficients can be correspondingly increased as well. By doing this, the number of choices of translators is increased, thereby permitting more efficient and/or more adequate translators in the context of a given implementation or application.

Let W(N) represents the set of all bit words of size N. A translator T for the set W(N) is a map (or operator)

$$T:W(N) \to W(N).$$

To ensure the recovery of lost data the P-backup disk and Q-backup disk must be updated as soon as any data word in the array is updated. Since this update happens very frequently, the optimization of this update process is significant.

For a given stripe s whose words are $w_1, w_2, \ldots, w_N$, the P-backup and Q-backup words are as follows:

$$P = w_1 + w_2 + \ldots + w_k + \ldots + w_N. \qquad (1)$$

$$Q = T_1(w_1) + T_2(w_2) + \ldots + T_k(w_k) + \ldots + T_N(w_N). \qquad (2)$$

As discussed supra, the sum of two words is understood to be a bitwise XORing of these words. The set of translators $\{T_1, \ldots, T_N\}$ will have some special properties which will be described infra.

To ensure recovery, P backup disk and Q backup disk must be updated as soon as any word of the stripe s is updated. If we wish to update word $w_k$ to $w_k'$, the P-backup and Q-backup words corresponding to that stripe must be updated to be:

$$P' = w_1 + w_2 + \ldots + w_k' + \ldots + w_N.$$

$$Q' = T_1(w_1) + T_2(w_2) + \ldots + T_k(w_k') + \ldots + T_N(w_N).$$

Since the sum of a word with itself yields the zero word (a zero word denotes a word wherein all bit therein are zero bits), we can update the P-backup and Q-backup as follows:

$$P' = P + (w_k + w_k').$$

$$Q' = Q + T_k(w_k) + T_k(w_k').$$

The translators are required to be linear so that this update computation can be simplified. In other words, translator $T_k$ are required to satisfy the following conditions.

Condition 1

For any given words w and w'

$$T_k(w+w') = T_k(W) + T_k(w').$$

If $T_k$ satisfies this condition, the update of the Q-backup can be done using directly the sum of the new and old words (done already for the update of the P-backup. We get:

$$Q' = Q + T_k(w_k + w_k').$$

Next, we need to impose two more conditions on our translators in order for them to ensure further recovery.

If P or Q (or both) are lost (but no data word is lost), we can re-compute them using $w_1$ through $w_N$ using (1) and (2). If any one data word $w_k$ is lost (but not P), we can recompute $w_k$ using (1) (note that sum and difference are the same in GF(2)):

$$w_k = w_1 + \ldots + w_{k-1} + w_{k+1} + \ldots + w_N + P.$$

If Q was lost along with $w_k$ we could, once $w_k$ recovered, re-compute Q using (2). As can be appreciated, the only losses the set up described in (1) and (2) does not ensure is the loss of a single data word $w_k$ along with P and the loss of two or more data words.

The following two conditions address these types of losses.

Condition 2

Every translator $T_k$ needs to be a bijection (one-to-one correspondence), i.e. there must be a mapping $T_k^{-1}: W(N) \to W(N)$ such that $T_k^{-1}(T_k(w)) = w$ for any word w.

Condition 3

The sum $(T_j + T_k)$ of any two translators $T_j$ and $T_k$ must be a bijection.

A translator T is a bijection means that there must be a mapping $T^{-1}: W(n) \to W(n)$ such that $T^{-1}(T(w)) = w$ for any word w. We call this mapping $T^{-1}$ the inverse mapping of T. In Condition 3 the sum of two translators $T_j$ and $T_k$ is defined to be the mapping $(T_j + T_k): W(n) \to W(n)$ verifying $(T_j + T_k)(w) = T_j(w) + T_k(w)$ for any given word w.

Condition 2 ensures that when a word $w_k$ is lost, along with the word P corresponding to its line, it could be recovered. Indeed, assuming relations (1) and (2) are maintained, we have $$T_k(w_k) = T_1(w_1) + T_2(w_2) + \ldots + T_{k+1}(w_{k+1}) + \ldots + T_N(w_N) + Q$$

(Note that addition and subtraction are equivalent here). Since all the terms of the right hand side are known, we can compute $T_k(w_k)$ and deduce $w_k$ using $T_k^{-1}$:

$$w_k = T_k^{-1}(T_k(w_k)).$$

We then recompute P using (1), thereafter we are back to a normal state.

The condition 3 allows us to recover if we loose two data words $w_j$ and $w_k$. Indeed, (1) and (2) yield $$w_j + w_k = w_1 + \ldots + w_{j-1} + w_{j+1} + \ldots + w_{k-1} + w_{k+1} + \ldots + w_N \quad (3)$$

and $$T_j(w_j) + T_k(w_k) = T_1(w_1) + \ldots + T_{j-1}(w_{j-1}) + \ldots + T_{k-1}(w_{k-1}) + T_{k+1}(w_{k+1}) + T_N(w_N). \quad (4)$$

Since all the terms of the right hand side are known, we can compute $w_j + w_k$ and $T_j(w_j) + T_k(w_k)$. Let these two words be A and B respectively denoted by $T_{jk}^{-1}$ the inverse mapping of $T_j + T_k$ (the existence of this inverse is exactly what Condition 3 ensures). Then $$w_j = T_{jk}^{-1}(T_k(A) + B) \quad (5)$$

and $$w_k = T_{jk}^{-1}(T_j(A) + B). \quad (6)$$

Indeed, $$T_j(A) = T_j(w_j + w_k) = T_j(w_j) + T_j(w_k) \quad \text{(by Condition 1)}$$

hence $$B + T_j(A) = T_j(w_j) + T_k(w_k) + T_j(w_j) + T_j(w_k) = T_k(w_k) + T_j(w_k)$$

(since the two $T_j(w_j)$ cancel each other out), so by definition of the sum of translators;

$$B + T_j(A) = (T_k + T_j)(w_k).$$

Making $T_{jk}^{-1}$ operate on both sides of this equation we get that $$T_{jk}^{-1}(B + T_j(A)) = T_{jk}^{-1}((T_k + T_j)(w_k)) = w_k.$$

We get $w_j = T_{jk}^{-1}(T_k(A) + B)$ by a similar argument. Note that once, say $w_j$, is obtained, we can get $w_k$ with the simple computation $w_k = A - w_j$. One benefit of the use of (5) and (6) is that the two can be calculated in parallel.

A more Intuitive depiction can be described as follows. One can compute the P-parity using the standard way in that one can sum all the words of a given line together. The Q-parity, on the other hand is obtained by first translating every word of a given line with a particular translator corresponding to it's position in the line, and then summing these translations together. Further, every translator must be "smooth" (linear (condition 1)) and "backtrackable" (bijective (condition 2)), that is one needs to be able to tell what word has been translated if translation is done. Further, the sum of any two translators must be "backtrackable" (bijective (condition 3), that is we must be able to tell which word has been translated by both translators if given the sum of both translations.

This approach generalizes the standard approach using Galois fields and even Commutative Rings since the present teaches in the context of 2 or more redundant disks in an array of more than two data disks having fixed large word size the following:

1. Multiplication by a constant $c_k$ in a given field or ring is linear; for any given words and w', it is true that $c_k*(w+w') = c_k*w + c_k*w'$.
2. $c_k$ has an inverse $c_k^{-1}$ so that any given word w can be retrieved from the product $c_k*w$ since $c_k^{-1}*c_k*w = 1*w = w$ (1 corresponds to the word 00 . . . 01).
3. The sum of any two coefficients $c_j + c_k$ is an element of the field or ring, hence has an inverse.

Showing these three properties corresponds to show, or is the equivalent of showing, that a set of distinct coefficients of a field satisfies the three conditions we imposed on our set of translators.

The linearity condition (Condition 1) of the translators suggests that we can represent them by matrices. If the size of one word is N, our matrix should have N columns of words of size N (we call this a N×N matrix). The matrix $M_k$ corresponding to translator $T_k$ will be such that the $i^{th}$ column of $M_k$ is the word $T_k(e_i)$ where $e_i$ is the word having all 0s except in the $i^{th}$ position.

The bijectivity of a translator corresponds to the invertibility of its related matrix. A matrix M is invertible if and only if the sum of any subset of its rows is non-zero. This is to say that not only no row can have all it's entries being 0, but also summing any two, three etc. rows of M must not result to the all-zero word.

The sum of two translators will correspond to the sum (in GF(2)) of its related matrices, that is, the matrix obtained by XORing each digit of one matrix with the digit of the other matrix which is at the same position.

A set of translators for a line of N words of size n will be hence a set of N $n_x n$ matrices such that every matrix is invertible, and the sum of any two matrices of the set is also invertible. That is, every individual matrix and the sum of any two matrices must have the following properties:

a) No row can have all it's entries being 0 and
b) XORing any two, three etc. row must not result in the all-zero word.

A set of columns satisfying a) and b) is said to be linearly independent.

The following representation shows explicitly which bits of word w must be XORed in order to obtain its translation $T_k(w)$. For example, if the $i^{th}$ row is 00101001, then the $i^{th}$ bit of the translated word is obtained by XORing together the third, fifth and eighth bit of the input word. Knowing this, the set of translators can be chosen so as to suit the implementations structure and requirements. For example we can minimize the total number of XORs needed for a translation by minimizing the total number of 1s in the matrix. We can further minimize the number of parallel XOR levels (if handling the computation of each bit of the translation in parallel) by minimizing the number of 1s per row. In addition, we can also choose the matrices so as to facilitate the pipelining of the XORs, etc.

Note that this scheme can be easily generalized to handle any number of disks failures with only f redundancy disks. In other words, so far only 2 redundancy disks (P and Q) are provided. This necessarily means that only 2 errors can be corrected in a single array. However, if required, the present invention can use any natural number of redundancy disks greater than 2. For example, the present invention contemplates using 3 redundancy disks (e.g., P, Q, and Q') to correct 3 errors occurring before correction or backup is performed. But it should be noted that for redundancy disks of greater than 2, increased number of computations than the 2 redundancy system is necessarily required. Therefore, depending upon the number of data disks and their quality, a given number of redundancy disks can be determined.

Methods of Matrix Set Generation

Lets define a set of {0,1}-matrices that satisfies the recoverability conditions described supra as a safe set. The more safe sets we possess, the more choices we shall have for use when required. Finding a large enough safe set can be difficult. Using known brute force "generate and check" algorithm may have exponential time complexity. Indeed, there is an order of $2^{d \times n \times n}$ sets of d nxn matrices, and for every one of these sets, checking to see if these are safe requires an order of $d^2 2^n$ checks where d is the number of matrices in a set. An improvement can be achieved by using linear algebraic techniques and dexterous algorithmic design.

Suppose the choice of row words has a restricted and fixed structure; and the row words are independent of the other rows. Further, the number of desired matrices is fixed in advance. The following method of safe matrix set generation may be used. The method involves simply attempt to complete all rows of the matrices one by one, matrix by matrix, starting from the first row of the first matrix till the first row of the last matrix, then moving on to the second row of the first matrix, till the second row of the last matrix, and so on. At every step one must choose from the fixed set of words that can be used for matrix rows, and check for conditions or properties a) and b) listed supra. If the check fails, one must backtrack and choose another word for the previous position. This method reduces the overall number of checks, but can still be for all practical purposes intractable for some word spaces and number of disks.

The instant invention provides an improved method for generating many safe sets of matrices is provided. A given seed of invertible matrix and a generator key word are used to generate these safe sets. Generating these sets with different choices of seeds and words allows one to create a family of safe sets out of which to choose an optimal safe set. The optimal safe set is defined as a safe set which optimizes specific metrics of the chosen implementation scheme. In designing a disk array with N data disks, one can choose an optimal subset of size N from one of the safe sets. The point is that any subset of a safe set is safe.

The generation takes a seed $M_1$ (an invertible matrix), $$M_1 = \begin{bmatrix} -w_1- \\ -w_2- \\ \ldots \\ -w_n- \end{bmatrix},$$

and let $K(1), K(2), \ldots, K(n)$ be the bits of any word K with $K(1)=1$.

$$\text{The matrices } M_i = \begin{bmatrix} -w_i- \\ -w_{i+1}- \\ \ldots \\ -w_{i+n-1}- \end{bmatrix} \quad (i = 2, 3, \ldots)$$

are recursively defined so that all $w_j$ are obtained by the n previous words $w_{j-1}, w_{j-2}, \ldots, w_{j-n}$ through the relation $$w_j = K(1)w_{j-n} + K(2)w_{j-n-1} + \ldots + K(t)w_{j-n+t-1} + \ldots + K(n-1)w_{j-2} + k(n)w_{j-1}.$$

We obtain $M_i$ from $M_{i-1}$ by letting rows 1 through n–1 of $M_i$ be respectively rows 2 through n of $M_{i-1}$, and letting row n of $M_i$ be obtained by summing given rows of $M_{i-1}$—these rows being determined by the key word K.

By this method we can check the invertibility of the matrix $M_i$ a lot faster. More precisely;

1) $M_i$ is automatically invertible. Indeed the first n–1 rows of $M_i$ are automatically linearly independent (these were the last n–1 rows of $M_{i-1}$, which is invertible) and the K(1)=1 requirement forces the independence of any combination of the first n–1 rows of $M_i$ with the last row.
2) This set up reduces the number of conditions to check for the invertibility of $M_h+M_i$ for h=i–n, . . . , i–1. Namely the first i–h rows of $M_h+M_i$ are automatically linearly independent.

Figure 1A:
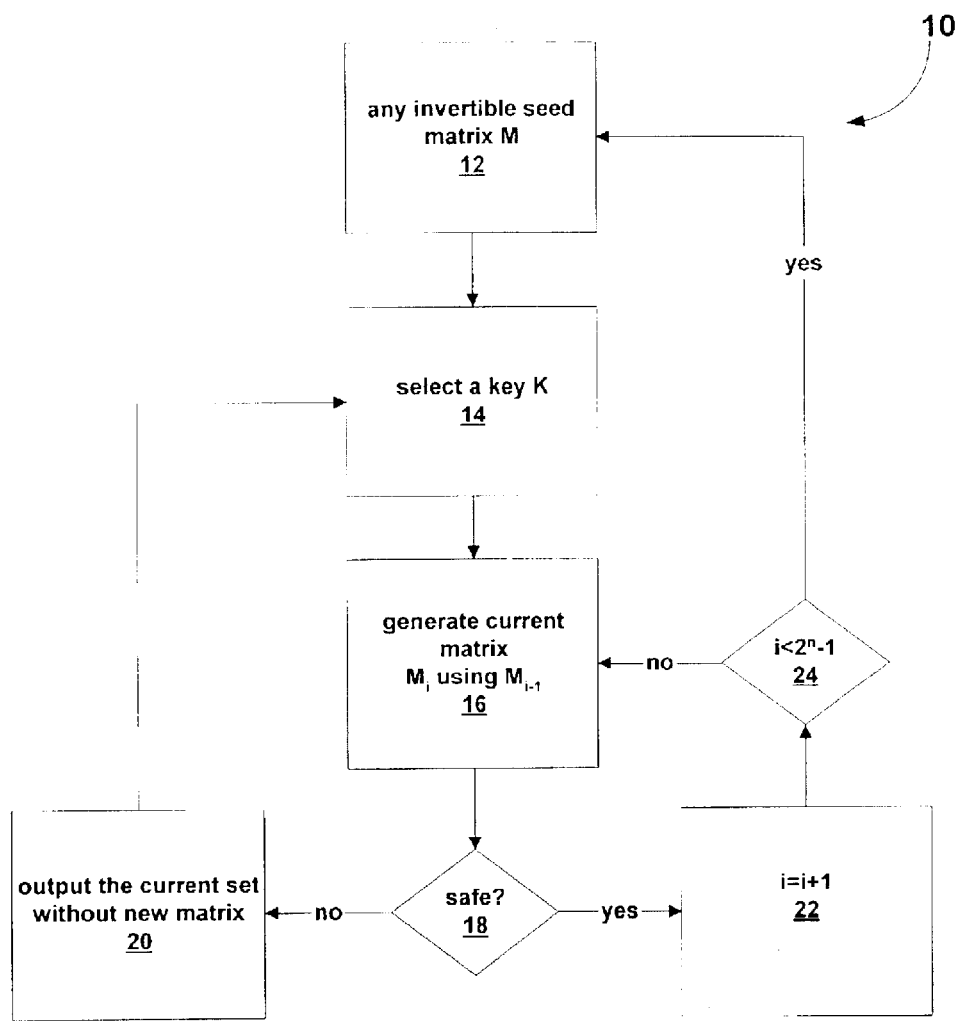
FIG. 1A is a flowchart depicting the present invention.

Referring to FIG. 1A, flowchart 10 depicts a method suitable for both hardware as well as software implementation.

a) Start with any invertible seed matrix $M_1$ (step 12).
b) Select a key K (step 14).
c) Use the current matrix $M_{i-1}$, (initially i=2) and the key K to generate next matrix $M_i$ (step 16) as described above. Then check if the set remains safe when this new matrix is added thereby $M_i$ (step 18).
d) If the set is still safe then increase i by 1 (step 22) and go to step 18. If the set is no longer safe then output (step 20) the current set (without new matrix) and go to step 14. If all the possible choices of Matrices $M_i$ have been exhausted (step 24) then go to step 12.

Note that this method may be enhanced to produce yet a broader range of safe matrix set. To do so, instead of computing the "new word" of every new matrix using only words of the previous matrix, one can use words of earlier matrices even (not shown). One productive scheme would be, for example, not only use the "top word" of the previous matrix in calculating the new word, but use the XOR of the top words of several previous matrices (also not shown).

Note also that one could implement a similar method by shifting downward instead of upward, or by shifting columns instead of rows.

Let us illustrate the main method by example. We will choose a word having a size of 4.

a) Start with an invertible matrix, say the unit matrix:

$$M_1 \begin{bmatrix} 1000 \\ 0100 \\ 0010 \\ 0001 \end{bmatrix}$$

b) Select a key K. Let us say K=1010. It is noted that the selection of K has 8 choices, namely K={1000, 1001, 1010, 1011, 1100, 1101, 1110, 1111}. The selection of K=1010 is a random choice among the above 8.

c) To generate the subsequent matrix, shift the rows upward, and compute the new word:

$$\begin{matrix} Key & M1 & M2 \\ \begin{bmatrix} 1 \\ 0 \\ 1 \\ 0 \end{bmatrix} & \begin{bmatrix} 1000 \\ 0100 \\ 0010 \\ 0001 \end{bmatrix} & \begin{bmatrix} 0100 \\ 0010 \\ 0001 \\ w_5 \end{bmatrix} \end{matrix}$$

Where $w_5 = K(1)w_1 + K(2)w_2 + K(3)w_3 + K(4)w_4 = w_1 + w_3 = 1000 + 0010 = 1010$.

d) If $M_2$ and $M_1 + M_2$ are invertible, we can try to expand the sequence by going back to step c) with i=3.

$$\begin{matrix} Key & M_1 & M_2 & M_3 \\ \begin{bmatrix} 1 \\ 0 \\ 1 \\ 0 \end{bmatrix} & \begin{bmatrix} 1000 \\ 0100 \\ 0010 \\ 0001 \end{bmatrix} & \begin{bmatrix} 0100 \\ 0010 \\ 0001 \\ 1010 \end{bmatrix} & \begin{bmatrix} 0100 \\ 0001 \\ 1010 \\ w_6 \end{bmatrix} \end{matrix}$$

Where $w_6 = K(1)w_2 + K(2)w_3 + K(3)w_4 + K(4)w_5 = w_2 + w_4 = 0100 + 0001 = 0101$ d) If $M_3$, $M_1 + M_3$ and $M_2 + M_3$ are invertible, we can try to expand the sequence by going back to step c) with i=4.

Continue this process until the matrix created in step c) fails to be invertible.

Illustration of the Instant Invention in Advanced RAID (by Way of an Example)

This illustration demonstrates a method that provides fault tolerance against two disk drive failures. This method may be implemented in hardware and may not require very high speed ASIC (Application Specific Integrated Circuits) process technology. The method can be expanded or scaled to any number of disk drives in an array and also to any number of data bits that will be processed simultaneously.

In some Advanced RAID implementation, to guard against any two disk drive failure, there are two check blocks created for every stripe of data. These check blocks are called P and Q check blocks. For example, if a stripe consists of 'n' data blocks DB1, DB2, . . . DBn then the P and Q blocks are computed as shown:

$P = DB1 + DB2 + \ldots + DBn$ $Q = M1(DB1) + M2(DB2) + \ldots + Mn(DBn)$

Note that in the equations above+means XOR operation.

$M_1, M_2, \ldots Mn$ are the unique matrices based on the position of the data blocks in the physical array. For example, if we want to operate on 4 bits of data at a time, then we need unique matrices M of size 4×4 such that $$Q = \begin{bmatrix} Q_1 \\ Q_2 \\ Q_3 \\ Q_4 \end{bmatrix}$$

$$= \begin{bmatrix} M_{1-11} & M_{1-12} & M_{1-13} & M_{1-14} \\ M_{1-21} & M_{1-22} & M_{1-23} & M_{1-24} \\ M_{1-31} & M_{1-32} & M_{1-33} & M_{1-34} \\ M_{1-41} & M_{1-42} & M_{1-43} & M_{1-44} \end{bmatrix} \begin{bmatrix} DB_{11} \\ DB_{12} \\ DB_{13} \\ DB_{14} \end{bmatrix} +$$

$$\begin{bmatrix} M_{2-11} & M_{2-12} & M_{2-13} & M_{2-14} \\ M_{2-21} & M_{2-22} & M_{2-23} & M_{2-24} \\ M_{2-31} & M_{2-32} & M_{2-33} & M_{2-34} \\ M_{2-41} & M_{2-42} & M_{2-43} & M_{2-44} \end{bmatrix} \begin{bmatrix} DB_{21} \\ DB_{22} \\ DB_{23} \\ DB_{24} \end{bmatrix} + \ldots$$

and $$P = \begin{bmatrix} P_1 \\ P_2 \\ P_3 \\ P_4 \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} DB_{11} \\ DB_{12} \\ DB_{13} \\ DB_{14} \end{bmatrix} + \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} DB_{21} \\ DB_{22} \\ DB_{23} \\ DB_{24} \end{bmatrix} + \ldots$$

Figure 2:
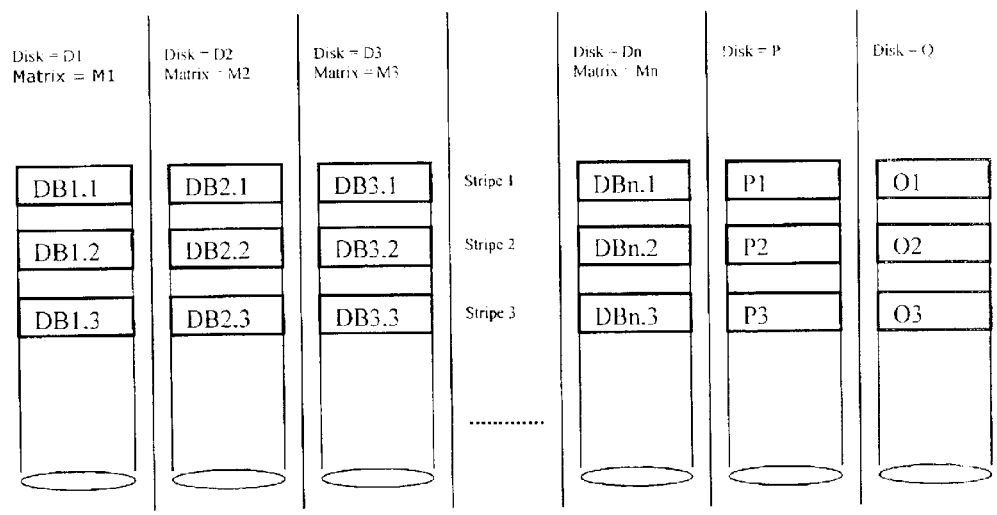
FIG. 2 is an exemplified embodiment of the present invention having fixed P and Q disks.

For example, FIG. 2 shows a fixed RAID 4 type of physical disk array where there is a fixed disk drive for P check blocks and a fixed disk drive for Q check blocks in the example above, the Matrix is fixed with having one block in every disk drive.

Figure 3:
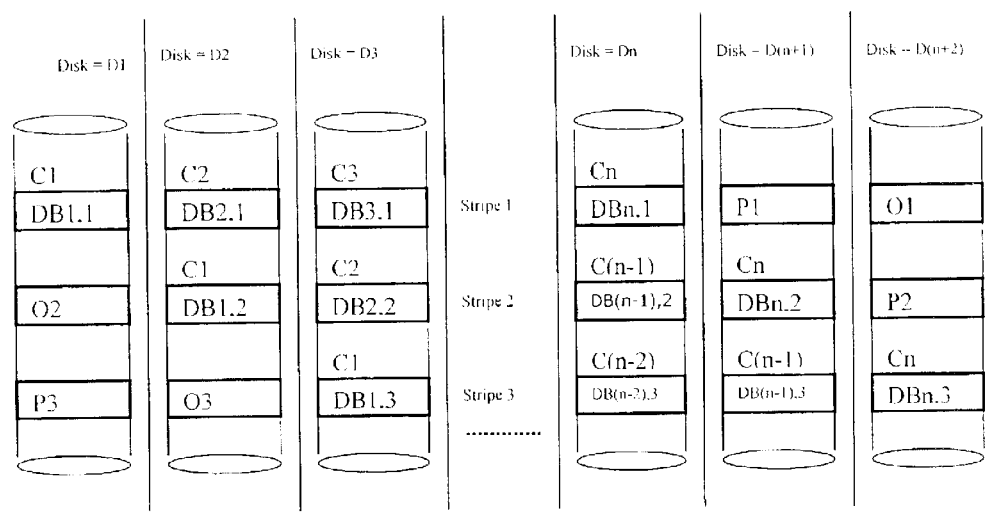
FIG. 3 is an exemplified embodiment of the present invention having distributed P and Q disks.

FIG. 3 shows another example where the P and Q check blocks are distributed over n+2 disks like in a RAID 5 array configuration. In this case, the Matrix is not fixed for a disk drive. The Matrix value depends on the position of a block in a particular stripe.

To simplify our example, we will show a detailed analysis based upon FIG. 2. It should be noted that the same method can be applied to FIG. 3 if each stripe in therein can be imagined as a separate disk array since the M value is not fixed to a physical disk. In other words, M is independent of physical disks. In the case of two disk failure in FIG. 2, we have:

Case 1: If the failure are two data disks k and m then
For stripe #s $DBk,s + DBm,s = IPs = Ps + \Sigma DBy,s (y=1, \ldots, n$ and $y \neq k$ or $m)$ (1a)

$Mk(DBk,s) + Mm(DBm,s) = IQs = Qs + \Sigma My(DBy,s)(y=1, \ldots, n$ and $y \neq k$ or $m)$ (2a)

IPs and IQs are intermediate P and Q values derived from reading all the non-failed disks and P and Q disks.
So the data blocks are regenerated from the equations below:

$DBk,s = (Mk + Mm)^{-1}(Mm(IPs) + IQs)$ (3a)

$DBm,s = (Mk + Mm)^{-1}(Mk(IPs) + IQs)$ (4a)

Case 2: If the failure is one data disk k and check disk P
For stripe #s $Mk(DBk,s) = IQs = Qs + \Sigma My(DBy,s)(y=1, \ldots, n$ and $y \neq k)$ (5a)

$DBk,s = (Mk)^{-1}(IQs)$ (6a)

$Ps = \Sigma DBy,s (y=1, \ldots, n)$ (7a)

The Ps is calculated after DBk,s is recovered.

Case 3: If the failure is one data disk k and check disk Q
For stripe #s $$DB_{k,s} = P_s + \Sigma DB_{y,s}(y=1, \ldots, n \text{ and } y \neq k) \quad (8a)$$

$$Q_s = \Sigma M_y(DB_{y,s})(y=1, \ldots, n) \quad (9a)$$

The Qs is calculated after DBk,s is recovered.

So in cases 1 and 2, to calculate the data bits properly, all the matrices Mk should be individually invertible and the sum of any two matrices Mj and Mk in the set of matrices My (y=1 to n) should be invertible. If they are not invertible, we won't be able to get 'w' set of unique algebraic equations to solve all 'w' bits in a data word. Note that in the case of two data block failures, the equation 1 provides 'w' set of unique equations.

So when the Matrices of size w×w are chosen, they should satisfy conditions 2 and 3 mentioned in section 3.

It is noted that in a write operation in an optimal disk array (no disk has failed), if a data block DBj,m in stripe 'm' needs to be updated with new data (partial stripe write), the new values of Pm and Qm can be computed as below:

New $P_m$=Old $P_m$+Old $DB_{j,m}$+New $DB_{j,m}$

New $Q_m$=Old $Q_m$+($C_m$*(Old $DB_{j,m}$+New $DB_{j,m}$))

So the above operation requires reading three old blocks from the disk array, compute new P and Q blocks and writing the new data block, new P and new Q block.

For a whole stripe write operation in an optimal disk array (no disk has failed) or degraded disk array (one or two disk failure), the old data blocks, P and Q blocks do not need to be read. The new P and Q are calculated from the new data blocks of the full stripe.

New $P_m$=New $DB_{1,m}$+New $DB_{2,m}$+ . . . +New $DB_{n,m}$

New $Q_m$=($C_1$*New $DB_{1,m}$)+($C_2$*New $DB_{2,m}$)+ . . . +($C_n$*New $DB_{n,m}$)

In the case above, for an optimal disk array, there are n+2 block writes that include P and Q. For a degraded array with one disk failure, there will be n+1 block writes. Also if P or Q block belongs to the failed disk, then P or Q block does not need to be calculated. For a degraded array with two disk failures, there will be n block writes. Also if P or Q or both P and Q blocks belong to the two failed disks then P or Q or both P and Q do not need to be calculated.

For a write operation in a degraded disk array with failure in one disk position with distributed data, P and Q blocks as shown in FIG. 3, if a data block DBj,m in stripe 'm' needs to be updated with new data (partial stripe write), the new values of Pm and Qm can be computed as below:

1. If the data block DBj,m does not belong to failed disk then,

New $P_m$=Old $P_m$+Old $DB_{j,m}$+New $DB_{j,m}$

New $Q_m$=Old $Q_m$+($C_m$*(Old $DB_{j,m}$+New $DB_{j,m}$))

Above operation requires reading three old blocks from the disk array, compute new P and Q blocks and writing the new data block, new P and new Q block. It is noted that New Pm or New Qm does not need to be calculated if any of these two blocks belong to the failed disk since it cannot be updated.

2. If the data block DBj,m belongs to the failed disk then,

New $P_m$=(XOR of $DB_{n,m}$ where $n$ is not equal to $j$)+(New $DB_{j,m}$)

New $Q_m$=(XOR of ($C_n$*$DB_{n,m}$) where $n$ is not equal to $j$)+($C_m$*New $DB_{j,m}$)

Above operation requires reading n+1 old blocks from the disk array, compute new P and Q blocks and writing new P and new Q block.

For a write operation in a degraded disk array with failure in two disk positions with distributed data, P and Q blocks as shown in FIG. 3, if a data block DBj,m in stripe 'm' needs to be updated with new data (partial stripe write), the new values of Pm and Qm can be computed as below:

1. If the data block DBj,m does not belong to failed disk then,

New $P_m$=Old $P_m$+Old $DB_{j,m}$+New $DB_{j,m}$

New $Q_m$=Old $Q_m$+($C_m$*(Old $DB_{j,m}$+New $DB_{j,m}$))

The above operation requires reading three old blocks from the disk array, compute new P and Q blocks and writing the new data block, new P and new Q block. It is noted that New Pm and/or New Qm does not need to be calculated if any of these two blocks belong to the failed disk since it cannot be updated.

2. If the data block DBj,m belongs to one of the failed disk (assuming disk j & k failed) then, New $P_m$=Old $P_m$+Calculated Old $DB_{j,m}$+New $DB_{j,m}$ New $Q_m$=Old $Q_m$+($C_m$*(Calculated Old $DB_{j,m}$+New $DB_{j,m}$))

Where Calculated Old $DB_{j,m}=(M_j+M_k)^{-1}(M_k(IP_m)+IQ_m)$—Refer to equation 3a.

The above operation requires reading n old blocks from the disk array, compute new P and Q blocks and writing new P and new Q block. It is noted that New Pm or New Qm does not need to be calculated if any of these two blocks belong to the failed disk since it cannot be updated.

For a read operation in a degraded disk array with failure in one disk position with distributed data, P and Q blocks as in FIG. 2, if a data block DBj,m in stripe 'm' needs to be read, this can be achieved as below:

$$DB_{j,m} = P_m + \Sigma DB_{y,m}(y=1, \ldots, n \text{ and } y \neq j)$$

Above operation requires reading n+1 old block from the disk array and computing DBj,m.

For a read operation in a degraded disk array with failure in two disk positions with distributed data, P and Q blocks as in FIG. 2, if a data block DBj,m in stripe 'm' needs to be read, this can be achieved as below:

$$DB_{j,m}=(M_j+M_k)^{-1}(M_k(IP_s)+IQ_s) \quad \text{Refer to equation 3.}$$

Above operation requires reading n old blocks from the disk array and compute DBj,m.

A simple example of 4 data disk and two parity disks is shown below. We will take 4 bits of data for our example.

D1=0001

D2=0010

D3=0100

D4=1000

Let us assume that the following matrices are associated with this stripe of data:

$$\begin{matrix} M1 & M2 & M3 & M4 \\ \begin{bmatrix} 1000 \\ 0100 \\ 0010 \\ 0001 \end{bmatrix} & \begin{bmatrix} 0011 \\ 1000 \\ 0100 \\ 0010 \end{bmatrix} & \begin{bmatrix} 0110 \\ 0011 \\ 1000 \\ 0100 \end{bmatrix} & \begin{bmatrix} 1100 \\ 0110 \\ 0011 \\ 1000 \end{bmatrix} \end{matrix}$$

We can calculate P & Q as follows:

$$P = D1 + D2 + D3 + D4 = 1111.$$

$$Q = M1D1 + M2D2 + M3D3 + M4D4$$
$$= 0001 + 1001 + 1001 + 1001$$
$$= 1000$$

Let us examine the various disk failure cases and the recovery methods.

Case 1: D1 and D2 failed.

We calculate the IP and IQ (see equation 1 & 2) first.

$$IP = D3 + D4 + P$$
$$= 0100 + 1000 + 1111$$
$$= 0011$$

$$IQ = M3D3 + M4D4 + Q$$
$$= 1001 + 1001 + 1000$$
$$= 1000$$

D1 can be recovered as follows:

$$D1 = (M1 + M2)^{-1}(M2(IP) + IQ). \quad \text{See equation 3}$$

$$= \left( \begin{bmatrix} 1000 \\ 0100 \\ 0010 \\ 0001 \end{bmatrix} + \begin{bmatrix} 0011 \\ 1000 \\ 0100 \\ 0010 \end{bmatrix} \right)^{-1} \left( \begin{bmatrix} 0011 \\ 1000 \\ 0100 \\ 0010 \end{bmatrix} + \begin{bmatrix} 0 \\ 0 \\ 1 \\ 1 \end{bmatrix} + 1000 \right)$$

$$= \left( \begin{bmatrix} 1011 \\ 1100 \\ 0110 \\ 0011 \end{bmatrix} \right)^{-1} (0001 + 1000)$$

$$= \begin{bmatrix} 1001 \\ 1101 \\ 1111 \\ 1110 \end{bmatrix} (1001)$$

$$= 0001$$

Similarly, $$D2 = (M1 + M2)^{-1}(M1(IP) + IQ). \quad \text{See equation 3}$$
$$= (M1 + M2)^{-1}(0011 + 1000).$$
$$= (M1 + M2)^{-1}(1011).$$
$$= 0010$$

Case 2: D2 and P failed.

$$IQ = Q + M1D1 + M3D3 + M4D4. \quad \text{See equation 5}$$
$$= 1000 + 0001 + 1001 + 1001$$
$$= 1001$$

$$D2 = (M2)^{-1}(IQ). \quad \text{See equation 6}$$

$$= \begin{bmatrix} 0011 \\ 1000 \\ 0100 \\ 0010 \end{bmatrix}^{-1} (0001)$$

$$= \begin{bmatrix} 0100 \\ 0010 \\ 0001 \\ 1001 \end{bmatrix} (0001)$$

$$= 0010.$$

After calculating D2 we can calculate P as below:

$$P = D1 + D2 + D3 + D4. \quad \text{See equation 7}$$
$$= 1111.$$

Case 3: D2 and Q failed $$D2 = P + D1 + D3 + D4. \quad \text{See equation 8}$$
$$= 1111 + 0001 + 0100 + 1000$$
$$= 0010$$

After calculating D2, we can calculate Q as below:

$$Q = M1D1 + M2D2 + M3D3 + M4D4. \quad \text{See equation 9}$$
$$= 0001 + 1001 + 1001 + 1001$$
$$= 1000$$

FIGS. 4A–4H is a table showing a safe set of 255 matrices of size 8×8 obtained by the main method as depicted in FIG. 1A. The key used in the table equals 142. It should be noted that the above table is just an example for 8 bits matrices. The same method can be used to generate matrices of any suitable size.

One embodiment of the invention is implemented as a program product for use with a computer system such as, for example, the Advanced RAID storage system and described below. The program(s) of the program product defines functions of the embodiments (including the methods described below with reference to FIGS. 1–3 and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to embodiments of the present invention, other and further embodiments of the invention may be devised without departing from the basic scope thereof, and the scope thereof is determined by the claims that follow.

What is claimed is:

1. In an advanced RAID system, having at least one array of n disks wherein n is a positive integer greater than or equal to 2, and a set of m redundancy disks associated with said at least one array wherein m is a positive integer greater than or equal to 3, said system further includes data and redundancy data in the form of a set of word segments residing in the above disks, said word segments having equal length and predetermined size, a method for updating redundancy information, comprising:

providing a first expression of redundancy data in terms of a first summation of a sequence of data, said sequence including a summation of data segments;

providing a second expression of redundancy data in terms of a second summation, wherein the elements of said second summation includes elements of the first summation having each of the elements contained therein multiplied by a first sequence of co-effiecients;

providing a $m^{th}$ expression of redundancy data in terms of a $(m-1)^{th}$ summation of a sequence of data, wherein the elements of said $(m-1)^{th}$ summation includes elements of the $m^{th}$ summation having each of the elements multiplied by a $(m-1)^{th}$ sequence of co-effiecients;

computing said first expression having at most m unknown values;

computing said second expression having at most m unknown values, and second expression includes a set of translation of said sequence of data, said translation of data being subjected to conditions including for any 2 given words w and w' $T_k(w+w')=T_k(w)+Tk(w')$; and computing a $(m-1)^{th}$ set of values representing said $m^{th}$ sequence of co-efficients;

thereby a large set of co-efficients for first to m−1 expressions can be carefully selected for use in redundancy calculations for at most m disk failures.

2. The method of claim 1, wherein said first expression is expressed as:

$$P=DB1+DB2+DB3+ \ldots +DBn$$

wherein P is a first redundancy expression, DB1 ... DBn denotes data segments, and "+" represents an exclusive OR operation.

3. The method of claim 1, wherein said first expression is expressed as:

$$Q=M1(DB1)+M2(DB2)+M3(DB3)+ \ldots +Mn(DBn)$$

wherein Q is a second redundancy expression, DB1 ... DBn denotes data segments, "+" represents an exclusive OR operation, and M1 ... Mn denotes co-efficients.

4. The method of claim 1, wherein the summation is defined as an operation in which each element is subjected to exclusive OR operation.

5. The method of claim 1, wherein said word segments possess equal size.

6. The method of claim 1, wherein said translation data are further subjected to conditions including translator $T_k$ to be a bijection.

7. The method of claim 1, wherein said translation data are further subjected to conditions including the sum of any 2 translators, $sum(T_k+T_j)$, be a bijection.

8. The method of claim 1, wherein said first sequence of co-efficients includes a large set of a sequence of matrices, a method for generating said large set of matrices includes the steps of:

providing a seed matrix;

providing a key; and generating a second matrix using said key and said seed matrix;

thereby said second matrix is used as one of the co-efficient of said first sequence of co-efficients.

9. The method of claim 8 further comprising the step of generating a third matrix if a set is safe.

10. The method of claim 8 further comprising the step of not selecting the current set if said current set is not safe.

11. In an advanced RAID system, having at least one array of n disks wherein n is a positive integer greater than or equal to 2, and a set of 2 redundancy disks associated with said at least one array, said system further includes data and redundancy data in the form of a set of word segments residing in the above disks, said word segments having equal length and predetermined size, a method for updating redundancy information, comprising:

providing a first expression of redundancy data in terms of a first summation of a sequence of data, said sequence including a summation of data segments;

providing a second expression of redundancy data in terms of a second summation, wherein the elements of said second summation includes elements of the first summation having each of the elements contained therein multiplied by a first sequence of co-effiecients;

computing said first expression having at most 2 unknown values;

computing said second expression having at most 2 unknown values, and second expression includes a set of translation of said sequence of data, said translation of data being subjected to conditions including for any 2 given words w and w' $T_k(w+w')=T_k(w)+T_k(w')$; and computing a $(m-1)^{th}$ set of values representing said $m^{th}$ sequence of co-efficients;

thereby a large set of co-efficients for 2 expressions can be carefully selected for use in redundancy calculations for at most 2 disk failures.

12. The method of claim 11, wherein said first expression is expressed as:

$$P=DB1+DB2+DB3+ \ldots +DBn$$

wherein P is a first redundancy expression, DB1 ... DBn denotes data segments, and "+" represents an exclusive OR operation.

13. The method of claim 11, wherein said second expression is expressed as:

$$Q=M1(DB1)+M2(DB2)+M3(DB3)+ \ldots +Mn(DBn)$$

wherein Q is a second redundancy expression, DB1111 ... DBn denotes data segments, "+" represents an exclusive OR operation, and M1111 ... Mn denotes co-efficients.

14. The method of claim 11, wherein the summation is defined as an operation in which each element is subjected to exclusive OR operation.

15. The method of claim 11, wherein said word segments possess equal size.

16. The method of claim 11, wherein said translation data are further subjected to conditions including translator $T_k$ to be a bijection.

17. The method of claim 11, wherein said translation data are further subjected to conditions including the sum of any 2 translators, sum($T_k+T_j$), be a bijection.

18. The method of claim 11, where said first sequence of co-efficients includes a large set of a sequence of matrices, a method for generating said large set of matrices includes the steps of:

providing a seed matrix;

providing a key; and generating a second matrix using said key and said seed matrix;

thereby said second matrix is used as one of the co-efficient of said first sequence of co-efficients.

19. The method of claim 18 further comprising the step of generating a third matrix if a set is safe.

20. The method of claim 18 further comprising the step of not selecting the current set if said current set is not safe.

\* \* \* \* \*